US012780704B2

(12) United States Patent
Coppes et al.

(10) Patent No.: US 12,780,704 B2

(45) Date of Patent: Nov. 3, 2026

(54) MODULAR SUBSURFACE WASTEWATER TREATMENT SYSTEM

(71) Applicant: Infiltrator Water Technologies, LLC, Old Saybrook, CT (US)

(72) Inventors: Bryan Coppes, Old Saybrook, CT (US); Alexander Shain, Lyme, CT (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 405 days.

(21) Appl. No.: 18/532,724

(22) Filed: Dec. 7, 2023

(65) Prior Publication Data

US 2024/0190739 A1 Jun. 13, 2024

Related U.S. Application Data

(60) Provisional application No. 63/386,563, filed on Dec. 8, 2022.

(51) Int. Cl.

*C02F 3/28* (2023.01)

*C02F 103/00* (2006.01)

(52) U.S. Cl.

CPC ........ *C02F 3/288* (2013.01); *C02F 2103/005* (2013.01)

(58) Field of Classification Search

CPC .......... C02F 3/288; C02F 3/103; C02F 3/109; C02F 3/046; C02F 2103/005; C02F 2103/22; C02F 2201/003; C02F 2201/004; C02F 2201/007; C02F 1/006; E03F 1/002; E03F 3/04; Y10T 137/2564; Y10T 137/85938

See application file for complete search history.

(56) References Cited

U.S. PATENT DOCUMENTS

| | | | |
|---|---|---|---|
| 4,880,333 | A | 11/1989 | Glasser et al. |
| 5,597,264 | A | 1/1997 | Laak |
| 6,048,131 | A | 4/2000 | Laak |
| 6,485,647 | B1 | 11/2002 | Potts |

(Continued)

OTHER PUBLICATIONS

International Search Report dated Mar. 15, 2024, PCT/US2023/083179.

*Primary Examiner* — Pranav N Patel

(74) *Attorney, Agent, or Firm* — FINNEGAN, HENDERSON, FARABOW, GARRETT & DUNNER L.L.P.

(57) ABSTRACT

Systems, methods, and apparatuses are disclosed relating to onsite subsurface wastewater treatment systems and components thereof. Such systems may include a manifold of a subsurface wastewater treatment system. The manifold may further include a front wall and a rear wall, an internal cavity between the front wall and the rear wall, and a length. The manifold may further include one or more conduit port extending from the rear wall, a first connector port configured at one end of the manifold and defining an opening connected to said internal cavity, and a second connector port configured at an opposite end of the manifold and defining an opening connected to said internal cavity. The manifold may be incorporated into a subsystem or system for subsurface treatment of wastewater along with one or more conduits configured to receive and disperse wastewater.

19 Claims, 13 Drawing Sheets

(56) References Cited

U.S. PATENT DOCUMENTS

| | | | |
|---|---|---|---|
| 6,531,063 B1 | 3/2003 | Rose | |
| 6,659,687 B1 | 12/2003 | Donlin et al. | |
| 6,726,401 B1 | 4/2004 | Potts | |
| 6,814,866 B1 | 11/2004 | Potts | |
| 6,869,533 B2 | 3/2005 | Norgaard | |
| 6,887,383 B2 | 5/2005 | Potts | |
| 6,923,905 B2 | 8/2005 | Potts | |
| 6,959,882 B1 | 11/2005 | Potts | |
| 6,969,464 B1 | 11/2005 | Potts | |
| 7,157,011 B1 | 1/2007 | Potts | |
| 7,309,434 B2 | 12/2007 | Potts | |
| 7,351,005 B2 | 4/2008 | Potts | |
| 7,374,670 B2 | 5/2008 | Potts | |
| 7,384,212 B2 | 6/2008 | Currivan | |
| 7,465,390 B2 | 12/2008 | Potts | |
| 7,614,822 B1 | 11/2009 | Burritt et al. | |
| 7,744,759 B1 | 6/2010 | Potts | |
| 7,762,740 B1 | 7/2010 | Burritt et al. | |
| 8,007,201 B2 | 8/2011 | Currivan | |
| 8,104,994 B1 | 1/2012 | Donlin | |
| 8,142,106 B2 | 3/2012 | Couch et al. | |
| 8,617,390 B2 | 12/2013 | Potts | |
| 8,636,444 B2 | 1/2014 | Currivan | |
| 8,727,662 B2 | 5/2014 | Laudano et al. | |
| 8,777,515 B1 | 7/2014 | Donlin | |
| 8,834,727 B2 | 9/2014 | Potts | |
| 9,174,863 B2 | 11/2015 | Potts | |
| 9,403,692 B2 | 8/2016 | Potts | |
| 9,650,271 B2 | 5/2017 | Potts | |
| 9,656,892 B2 | 5/2017 | Potts | |
| 9,809,941 B1 | 11/2017 | Donlin | |
| 10,065,875 B2 | 9/2018 | Potts | |
| 10,189,722 B2 | 1/2019 | Potts | |
| 10,287,197 B2 | 5/2019 | Potts | |
| 10,371,287 B2 | 8/2019 | Potts | |
| 10,392,278 B2 | 8/2019 | Potts | |
| 10,519,053 B2 | 12/2019 | Potts et al. | |
| 10,550,561 B2 | 2/2020 | Potts et al. | |
| 10,655,316 B1 | 5/2020 | Currivan | |
| 10,900,214 B2 | 1/2021 | Currivan | |
| 10,906,825 B2 | 2/2021 | Potts | |
| 11,059,732 B2 | 7/2021 | Potts et al. | |
| 11,254,587 B1 | 2/2022 | King et al. | |
| 2004/0065364 A1* | 4/2004 | Evans | E03F 1/002 210/150 |
| 2008/0202999 A1 | 8/2008 | Potts | |
| 2009/0014380 A1* | 1/2009 | Houck | E03F 1/002 210/417 |
| 2009/0071884 A1 | 3/2009 | Potts | |
| 2009/0145830 A1 | 6/2009 | Couch et al. | |
| 2011/0062069 A1 | 3/2011 | Couch et al. | |
| 2013/0078038 A1 | 3/2013 | Potts | |
| 2013/0306570 A1 | 11/2013 | Potts | |
| 2016/0362319 A1 | 12/2016 | Potts | |
| 2017/0217787 A1 | 8/2017 | Presby et al. | |
| 2018/0319686 A1* | 11/2018 | Potts | C02F 3/046 |
| 2021/0155517 A1 | 5/2021 | Potts | |
| 2022/0018109 A1 | 1/2022 | Potts | |
| 2023/0234866 A1 | 7/2023 | Potts | |

* cited by examiner

MODULAR SUBSURFACE WASTEWATER TREATMENT SYSTEM

CROSS-REFERENCES TO RELATED APPLICATIONS

This application is based on and claims benefit of priority of U.S. Provisional Patent Application No. 63/386,563, filed on Dec. 8, 2022. The contents of the foregoing application is incorporated herein by reference in its entirety.

TECHNICAL FIELD

The disclosure relates to onsite subsurface wastewater treatment systems and components thereof.

BACKGROUND

When a municipal or community facility for wastewater treatment is not available, an onsite subsurface wastewater treatment system may be used for dwellings and small commercial buildings. Such systems may include a septic tank in which wastewater is subjected to primary treatment. Wastewater may then be directed for secondary treatment through distribution pipes to a plurality of water permeable conduits. The conduits may be configured to discharge the wastewater into surrounding sand, soil, or other permeable media. Typically, to the extent a site permits, conduits may be arranged in a multiplicity of parallel rows.

Conduits used in onsite subsurface treatment systems may include perforated round pipes that are placed within shallow trenches filled with crushed stone; arch shape cross-section plastic chambers having permeable walls that are connected end-to-end in a trench which is then backfilled with crushed stone, soil, sand, or the like; and vertically-oblong perforated conduits that have semi-rigid or fabric sides, which are backfilled with soil or other media after being arranged along straight paths and/or serpentine paths within an excavation. When installed: within soil, these kinds of secondary treatment apparatus are commonly referred to as leach fields and leaching systems.

Existing onsite leaching systems and leach fields may present certain drawbacks, including the cost of components and labor to install such systems. It is desirable to provide durable leaching systems that meet regulatory requirements while also providing solutions to simplify construction and assembly and decrease installation time of such systems. A system incorporating manufactured components should enable leaching systems that can be tailored to different site configurations and soil conditions. There exists a need for further improvement in subsurface treatment systems, and leaching systems in particular, including incorporating manufactured components and improving the arrangement and assembly of components at the point of system installation.

SUMMARY

In one embodiment, an onsite subsurface wastewater treatment system includes leaching components that are readily fabricable, durable, and quickly and easily installed. Another embodiment may include a kit of modular components that can be assembled in the field and can be configured in a variety of ways to provide a wastewater treatment system or subsystem.

In another embodiment, an onsite subsurface wastewater treatment subsystem may include (a) a manifold assembly having one or more interconnected manifolds; and (b) one or more perforated conduits, each perforated conduit having a proximal end connected to a manifold and extending transversely to the manifold to a capped distal end of the conduit. A manifold may be joined to one or more adjacent manifolds to form a manifold assembly. A wastewater inflow pipe may be connected to one of the one or more manifolds in a manifold assembly. During use, wastewater may flow through the wastewater inflow pipe and the manifold assembly, then into one or more of the conduits connected to the one or more manifolds, and then into the soil surrounding the one or more conduits where biological treatment takes place. The one or more manifolds and one or more conduits, which may be delivered to a leaching system installation site as a kit, can be interconnected to form a system having a layout of conduits that is particular suited to a particular site.

In some system embodiments, water may flow into a first manifold and a first set of one or more conduits substantially filling the one or more conduits in the first set before flowing to a second manifold associated with a second set of one or more conduits. Such a system may incorporate one or more weirs placed within joint connections of the systems or by incorporating a configuration of the plumbing that connects the first manifold and first set of one or more conduits to the second manifold and second set of one or more conduits. Such systems may be useful when the system and one or more sets of conduits are buried in sloped terrain. In first and second manifolds connected in such systems form a manifold assembly. Other embodiments may include more than a first and second manifold connected together to form a manifold assembly, such as three, four, or five manifolds. The number of manifolds connected to form a manifold assembly is not intended to be limited by this disclosure. Any number of manifolds could be connected to suit the needs of a particular installation site. Irrespective of the number of manifolds that form a manifold assembly in a particular embodiment, each manifold may correspond to a set of one or more conduits for dispersing water into the surrounding soil. In some embodiments, the conduits may be uniformly perforated throughout the surface area of the conduit, while in other embodiments, the conduits may be only perforated on the lower half of the surface area of the conduits, only along the bottom of the conduits, or at any location on the conduits that suit the needs of a particular installation site.

In one embodiment, a manifold has a front wall and a rear wall and an internal cavity separating the front wall from the rear wall. The manifold having a central lengthwise axis (CLA), may be configured to receive wastewater within the internal cavity. The manifold may include one or more connecting ports extending along the lengthwise axis of the manifold. The connecting ports may be openings that provide for fluidic communication between the internal cavity of the manifold and the outside of the manifold. In some embodiments the openings may have an oblong shape. In other embodiments the openings may have a rectangular shape or another suitable shape. In some embodiments in which the connecting ports are oblong shaped openings, the connecting ports may be oriented with the major axis of the oblong connecting port extending in the vertical direction during use. In some embodiments, a first connecting port of a manifold may be configured to receive, in male-female and snap lock fashion, for example, the opposing second connecting port of an adjacent, identical manifold, enabling quick construction of a manifold assembly. The front wall of a manifold may include one or more small domes. In some embodiments, a hole may be cut in one or more of the small domes to receive an inlet pipe. In some embodiments, first and second conduit ports may extend from the rear wall of the manifold perpendicular to the lengthwise axis of the manifold. Each of the first and second conduit ports may have an oblong shaped opening leading to the internal cavity. In some embodiments, a wall tie may structurally connect the front and rear walls of a manifold at a point between the first and second conduit ports.

In an embodiment of a manifold having one or more conduit connected to first and second conduit ports, each of the one or more conduits may have a ribbed and perforated exterior surface and a hollow interior. The interior of a conduit may include conduit tie structural elements configured to connect opposing vertical side walls of the conduit. In some embodiments, each exemplary conduit may be wrapped with a layer of geogrid (plastic mesh) which is overlaid by a layer of geotextile.

To install an exemplary modular wastewater subsurface system, an installation field is first excavated in the soil. In some embodiments, an installation field may have a rectangular, flat bottom. A manifold assembly comprising manifolds connected to one another in a snap-together fashion. A conduit is snap-connected into each conduit port of a manifold and, to prevent entry of soil, the far end of each conduit is capped or connected to another manifold.

In an embodiment, a blow molded plastic article may be formed and then severed into first and second pieces, the first piece being an oblong conduit and the second piece being a multi-purpose endcap. The multi-purpose end cap is configured to connect to one end of the oblong conduit. The opposite end of the oblong conduit is configured to connect to a port of a manifold or a fitting of another conduit. The multi-purpose endcap may be configured to alternatively connect to a port of the manifold, thereby closing off the port of the manifold. In some embodiments an endcap may be configured for use as an adapter by cutting a hole in a portion of the endcap enabling connection to another pipe. In yet other embodiments, an endcap may be configured for use as a weir.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

As discussed in further detail below, various embodiments of an onsite subsurface water treatment system are provided. Embodiments of the wastewater systems may include one or more manifolds and one or more conduits interconnected to treat wastewater. These and other features of the disclosed embodiments are discussed in more detail below.

Figure 1:
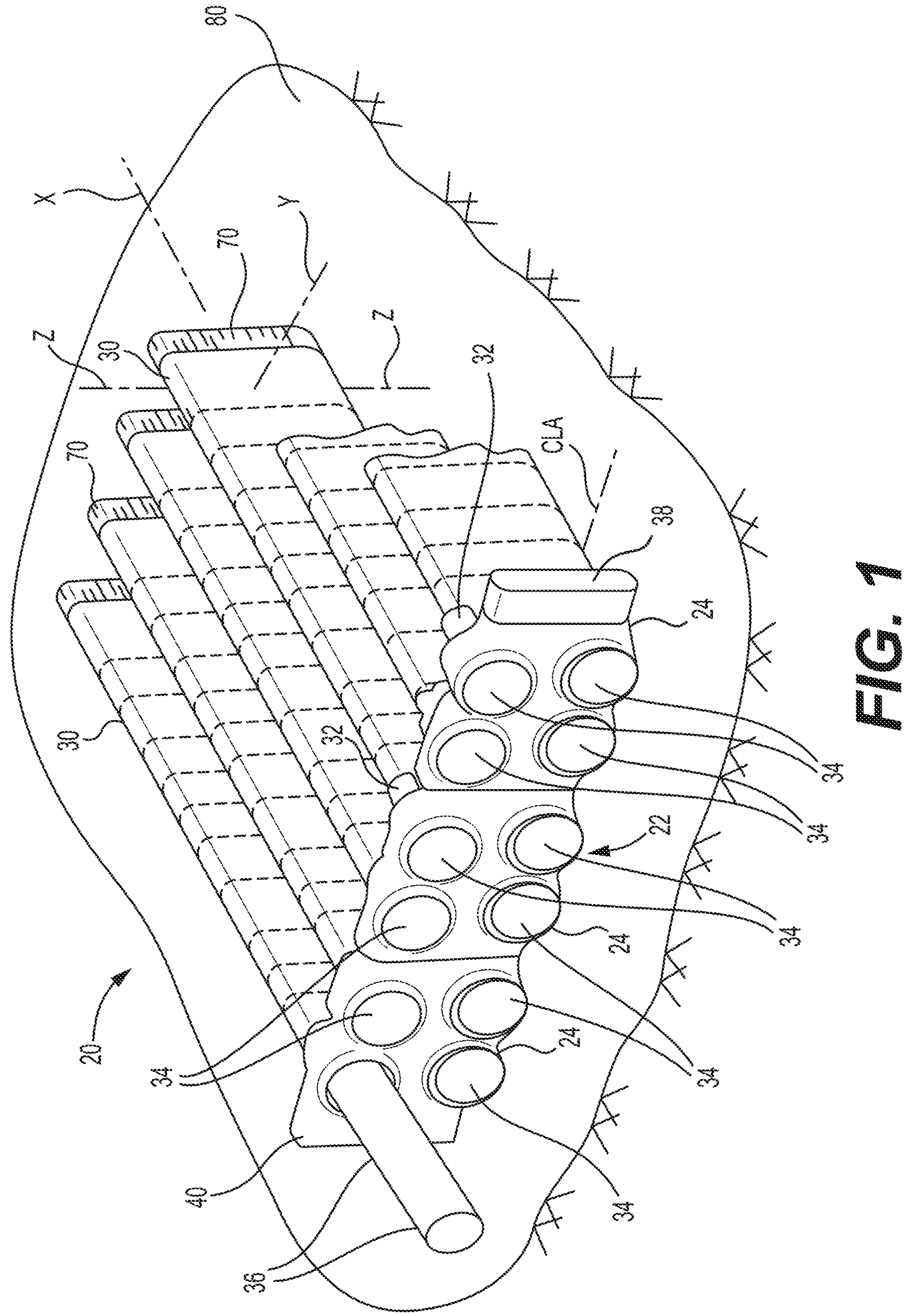
FIG. 1 illustrates a portion of a subsurface wastewater treatment system including an assembly of manifolds and a multiplicity of oblong shaped conduits, each extending from a manifold, consistent with embodiments of this disclosure.

Turning now to the drawings, FIG. 1 is a perspective view of an embodiment of wastewater treatment system 20. The system depicted in FIG. 1 comprises a manifold assembly 22 including a plurality of manifolds 24 that are connected to one another, in a side-by-side manner, along a central lengthwise axis (CLA). The plurality of manifolds 24 are in fluidic communication when arranged in manifold assembly 22, such that water can flow freely between connected manifolds 24. In some embodiments, the flow of water between connected manifolds 24 may be interrupted by the presence of a weir, baffle, or another type of obstruction. Each manifold 24 may have two conduit ports 32 on a first side of the manifold 24. Conduit ports 32 may have an oblong shape and may be configured to receive a conduit 30. In the embodiment depicted in FIG. 1, conduits 30 have an oblong shape in which the cross section of the conduit is oblong-shaped in the vertical direction when conduits 30 are installed in wastewater system 20. In the embodiment depicted in FIG. 1, each manifold 24 is a dual-port manifold, having a first conduit port configured to receive a first oblong-shaped conduit and a second conduit port configured to receive a second oblong-shaped conduit. In some embodiments, a manifold 24 may have one conduit port 32. In other embodiments, a manifold 24 may have more than two conduit ports 32, for example, three, four, five, six, or more conduit ports 32. In some embodiments, conduit ports 32 may have a rectangular shape and may be configured to receive conduits having a rectangular-shaped cross section. In other embodiments, conduit ports 32 may have other shapes.

Figure 2:
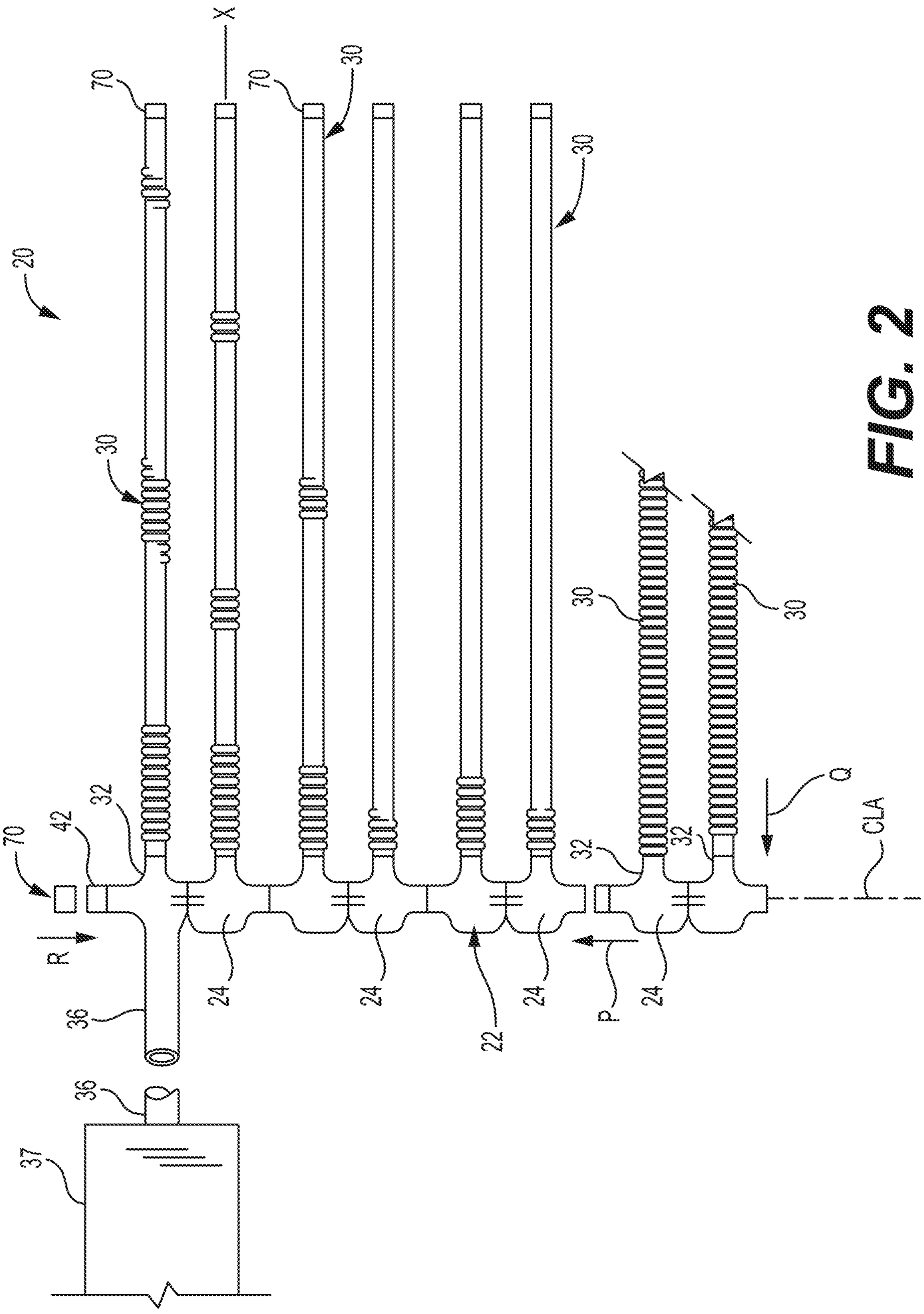
FIG. 2 illustrates a top view of the system of FIG. 1, including additional components present in some embodiments.

FIG. 1 and FIG. 2 show a plurality of conduits 30 extending from manifold assembly 22 in a direction perpendicular to the CLA of the manifold assembly 22. Each conduit 30 is connected at its proximal end to a first side of a manifold 24 through a conduit port 32. Each conduit 30 terminates at its distal end where the conduit 30 is closed off by an endcap 70. In some embodiments, one or more conduit 30 may be perforated. In yet other embodiments, perforated conduits 30 may be wrapped with a layer of geogrid (plastic mesh). And in yet other embodiments, perforated conduits 30 wrapped with a layer of geogrid may be further overlaid by a layer of geotextile. In some embodiments, a layer of geotextile may be overlaid directly over perforated conduits 30, without the presence of a layer of geogrid.

Each manifold 24 may include one or more shallow dome 34 on the first side of manifold 24. As depicted in the embodiment illustrated in FIG. 1, each manifold 24 includes four shallow domes 34. One or more shallow dome 34 may be configured to receive an inflow pipe 36 when an opening is made in shallow dome 34. In such embodiments, when in use, partially treated wastewater may be delivered to the manifold 24 from a source, for example a septic tank 37, through inflow pipe 36. During use, in embodiments in which conduits 30 are perforated, wastewater system 20 may be buried within suitable sand or soil backfill, permitting wastewater to flow outwardly from the perforated conduits 30 permitting biological treatment and dispersal of flow within the sand or soil backfill. While the embodiments depicted, including in FIG. 1, show a system having straight and parallel conduits 30 extending perpendicularly from a first wall of the manifolds 24 (and manifold assembly 22), in other embodiments, conduits 30 may run on angled paths or non-straight paths from the first wall of the manifolds 24 (or manifold assembly 22).

In some embodiments, a flat-bottom excavation in the earth will be created and workers will place and connect the manifolds and conduits therein. FIG. 2 is a top view of a wastewater system 20 as it is being assembled at the point of use. Arrow P shows the intended connection of a manifold 24 to an adjacent manifold 24 by interlocking engagement, to add to the manifold assembly 22 that has been previously put together. Arrow Q shows the intended connection of conduit 30 with a conduit port 32 by interlocking engagement with a manifold 24 at a first side of manifold 24. Arrow R shows the intended connection of a cap (closure) 70 with a first connector port 38 or a second connector port 40 on a side of a manifold 24, thereby ensuring that no additional manifolds 24 will be connected to manifold assembly 22.

Figure 4:
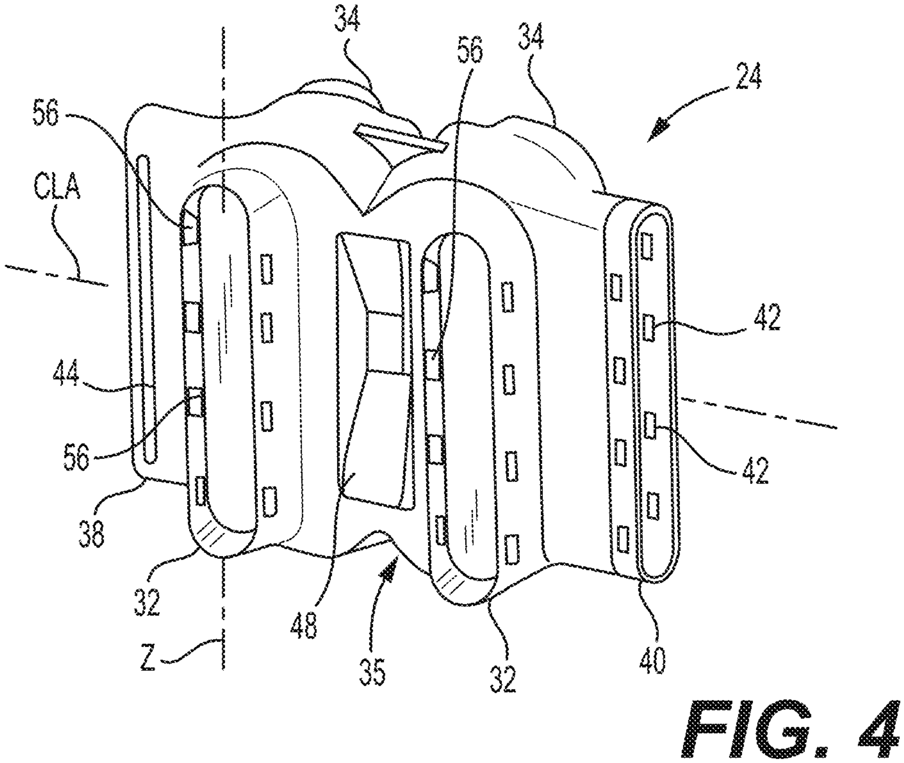
FIG. 4 illustrates a perspective view of the rear of the manifold of FIG. 3, consistent with embodiments of this disclosure.

In some embodiments, each conduit 30 may have an oblong cross section characterized by a major axis z and a shorter minor axis y. See FIG. 11, discussed below. As depicted in FIG. 4, each conduit port 32 of manifold 24 may have a port major axis z vertical.

Figure 7A:
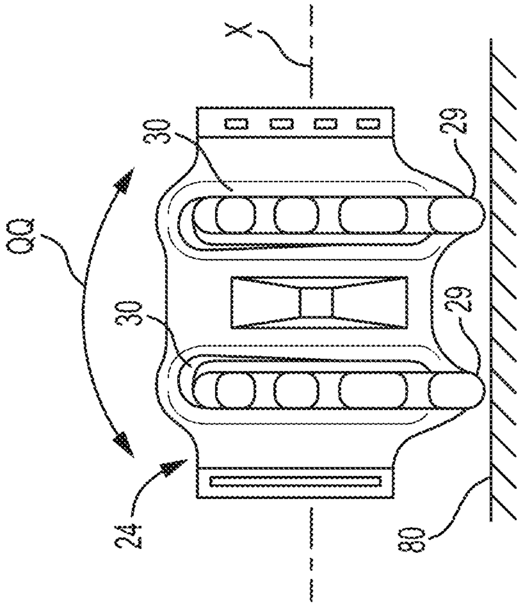
FIG. 7A illustrates the rear side of a manifold having conduits extending toward the viewer, consistent with embodiments of this disclosure.

In some embodiments, as depicted in FIG. 7A, manifold may have two or more conduit ports 32, each of which may be configured to receive a conduit 30. FIG. 7A is a view of the distal ends of two uncapped conduits 30 that extend from the ports of a manifold 24. A rounded end 29 of each conduit may rest on a flat surface 80 of an excavation site and each rounded end 29 may serve as a contact point between each conduit 30 and the flat surface 80 of the excavation site. The contact points may be spaced apart, thereby providing stability to the manifold and conduit subassembly, helping to stabilize the manifold and conduit subassembly by inhibiting rocking as indicated by arrow QQ in FIG. 7A. Thus, the dual port manifold embodiment may promote safety, stability, and efficiency during installation of the wastewater system. In some embodiments during installation, stakes, spacers, or pre-fabricated frames may be used to maintain the stability of conduits and minimize lateral movement of conduits at points distant from the manifold, prior to backfill.

As described below, in some embodiments, conduits may be made of semi-rigid plastic. In some embodiments, conduits 30 and manifolds 24 may be made by blow molding of a thermoplastic such as polyethylene or polypropylene, followed by trimming. Other plastics and well-known means of forming plastic articles may also be used.

As will be appreciated from other parts of this description, more or fewer manifolds may be interconnected to make a system suited for the anticipated wastewater flow, the size of the excavation site, and the character of the media in which the system is buried. Similarly, a wastewater treatment system 20 may be configured with a desired number of conduits. To fit the site and wastewater percolation requirements, the length of any conduit may be truncated, or may be extended by interconnecting conduits end-to-end, i.e., in serial fashion, through use of a conduit internal fitting 66, shown in FIG. 9, discussed below.

Figure 3:
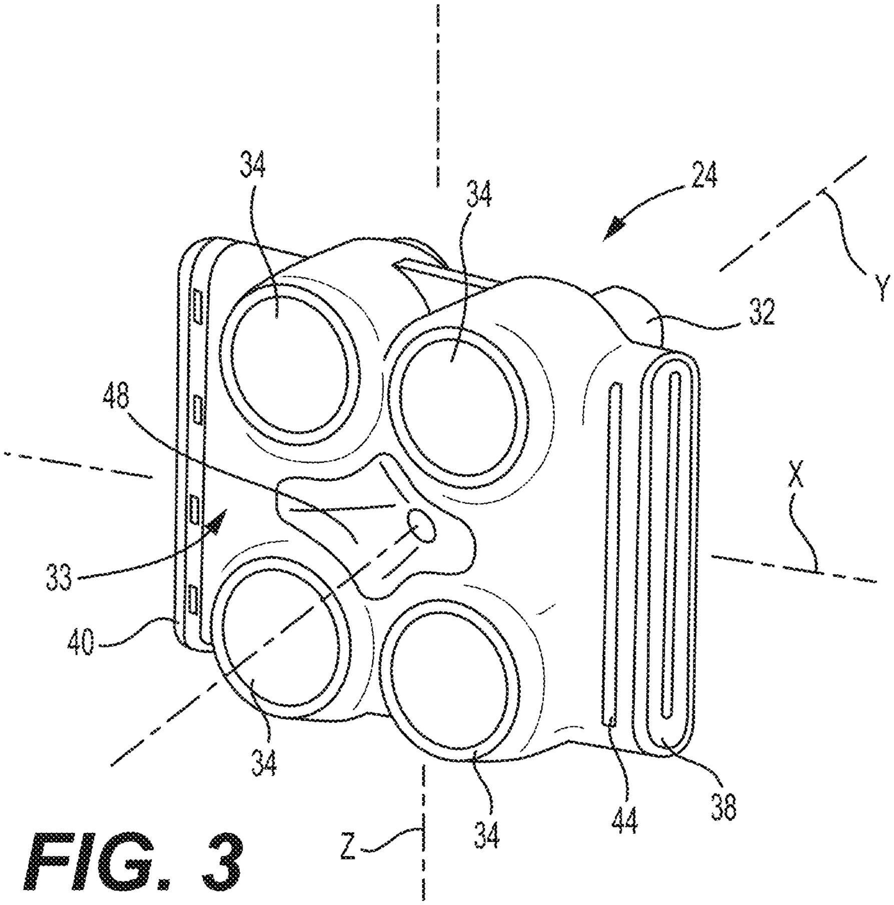
FIG. 3 illustrates a perspective view of the front of a manifold, consistent with embodiments of this disclosure.
Figure 5:
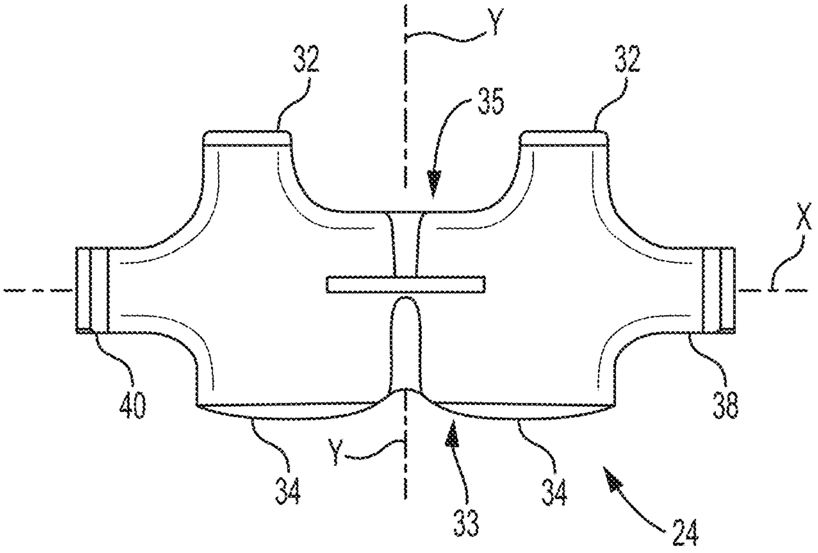
FIG. 5 illustrates a top view of the manifold of FIG. 3, consistent with embodiments of this disclosure.

FIG. 3 and FIG. 4 respectively show the first side and second side of a manifold 24. FIG. 5 shows manifold 24 in top view. (A bottom view would appear substantially the same.) Referring to the embodiments depicted in FIGS. 3, 4, 5 and 6, manifold 24 has a central lengthwise axis (CLA) which runs lengthwise through the center of a first connector port 38 (in some embodiments first connector port 38 may be a male connector port) and second connector port (in some embodiments second connector port 40 may be a female connector port). The CLA of manifold 24 corresponds with the x axis of the manifold. The figures also show the z axis which is normally vertical during manifold use, and the orthogonal y axis which runs from front to back of the manifold. Connector ports and conduit ports have corresponding vertical z axes and orthogonal x and y axes in the horizontal plane. Connecting ports and conduit ports are structural parts of the manifold.

In some embodiments, manifold 24 may be a first manifold and may include a first connector port 38 at a first end and a female connector port 40 at a second end opposite the first end, where the first connect port 39 is a male connector port and is configured to be received within the opening of a second connector port 40, which is configured as a female connector port, of an identical, adjacent manifold (also referred to herein relating to some embodiments as a second manifold). The opening of second (female) connector port 40 may have a plurality of inward-projecting tabs 42 as can be seen in FIG. 4. First (male) connector port 38 may have an opposing side exterior vertical grooves 44, which may connect to each other to circumscribe a port. Alternatively, shorter localized depressions or grooves may be used. Tabs 56 of the mating connector port are located to engage a vertical portion of a groove 44. As described below, each of first (male) connector port 38 and second (female) connector port 40 may also accommodate connection of a conduit with or without an adapter, for other system configurations.

Figure 6:
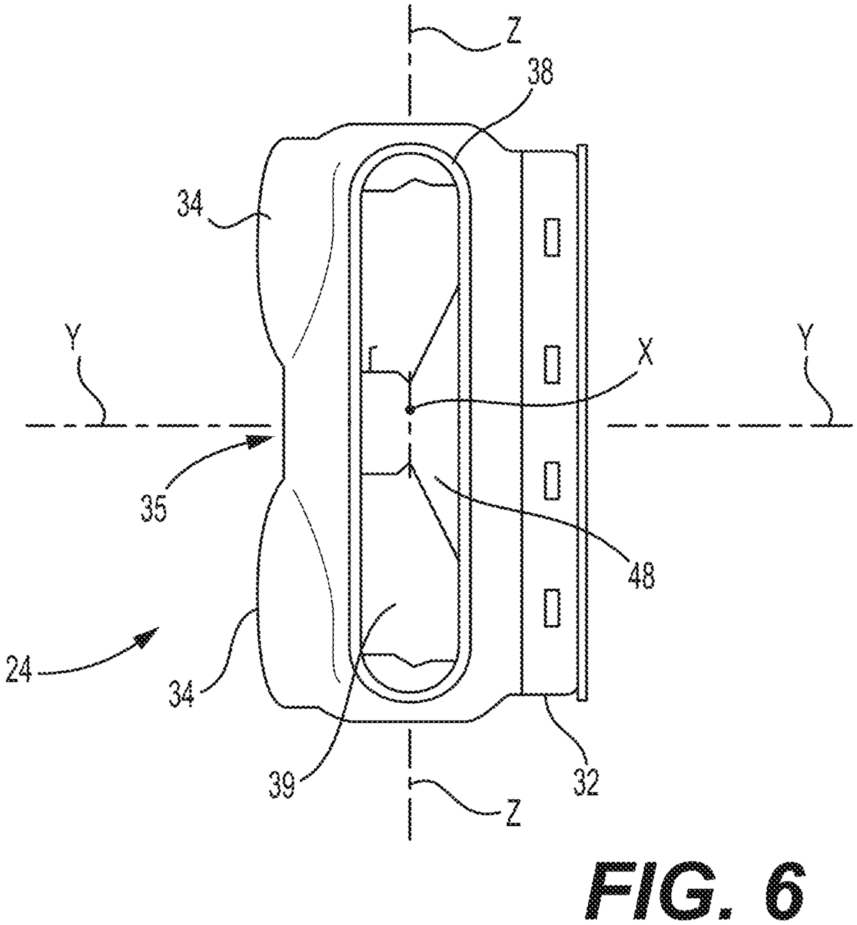
FIG. 6 illustrates a side view of the manifold of FIG. 3, consistent with embodiments of this disclosure.

FIG. 6 depicts an embodiment of first connector port 38 which has a periphery defining an oblong opening that has a major axis z and a minor axis y. A mating opposing second connector port 40 likewise has a periphery defining an oblong opening that has a major axis z and a minor axis y. During normal use of manifold 24 the major axis z thereof is nominally vertical. Thus, first connector port 38 and second connector port 40 may be called "vertically oblong," as may the conduit ports 32.

FIG. 6 also depicts an embodiment of manifold 24 in side-view enabling a view of internal cavity 39. The internal cavity 39 is the interior space within the manifold 24 that during use is configured to contain wastewater. Internal cavity 39 of manifold 24 may be bounded in the x axis direction by rear wall 33 at the second side of manifold 24 and front wall 35 at the first side of manifold 24, which curve toward each other at their respective upper and lower ends, being integral on the x-z plane. See FIGS. 3, 6, and 7. The vertical sides of front wall 35 and rear wall 33 may be joined to each other at a first end of manifold 24 by first connecting port 38 and at a second end of manifold 24 by second connector port 40, the opening of each port being connected to internal cavity 39. See FIGS. 5 and 6.

Figure 7:
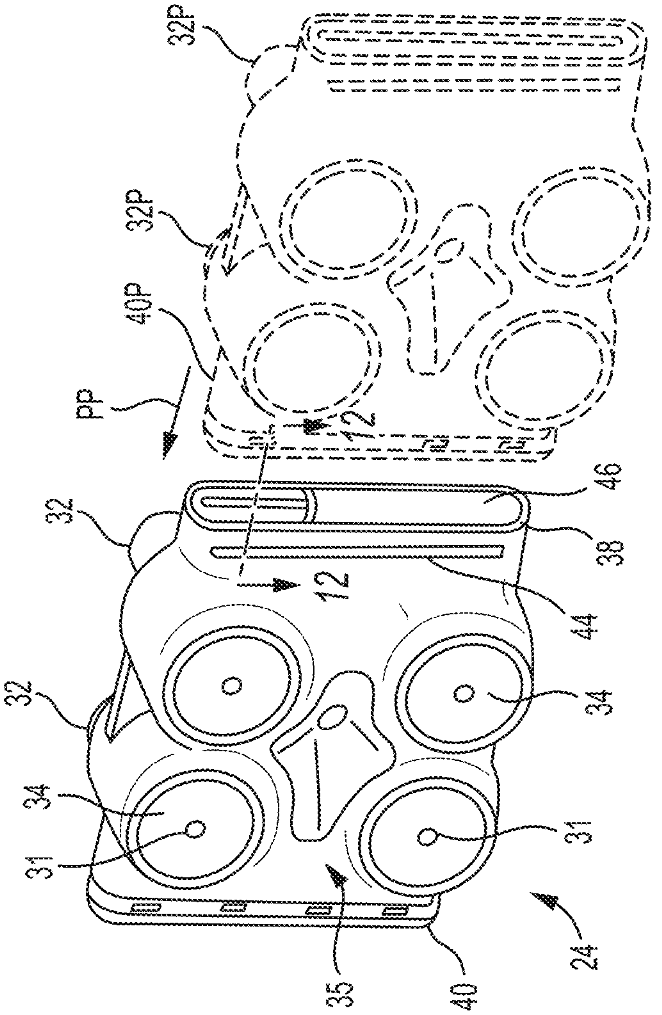
FIG. 7 illustrates in perspective view a first manifold with a weir at a conduit port and depicts the capability to connect a second manifold to the first manifold via the first manifold conduit port, consistent with embodiments of this disclosure.
Figure 12:
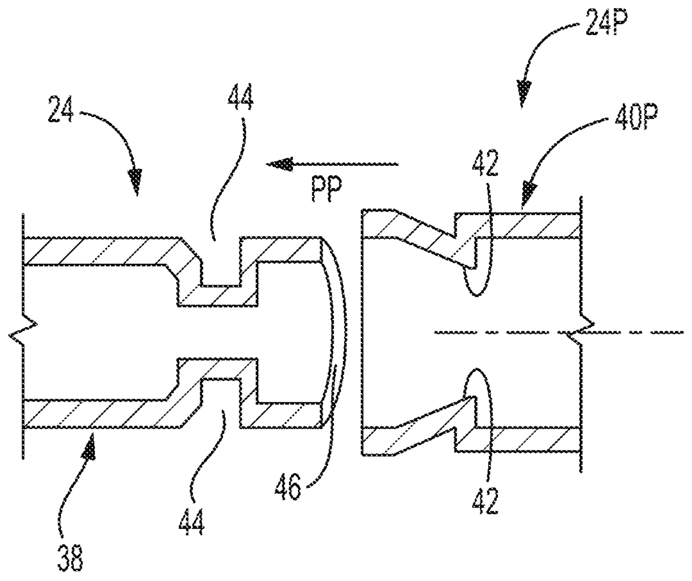
FIG. 12 illustrates an example of a connection between a first manifold and a second manifold, consistent with embodiments of this disclosure.

FIG. 7 depicts an embodiment of a first manifold 24 with a second identical manifold 24P (shown in cross-hatching) in the process of being connected, as indicated by the arrow PP. See also the partial horizontal cross section of FIG. 12. With further movement of second manifold 24P toward first manifold 24, female connecting port 40P of second manifold 24P would fit over first (male) connector port 38 of first manifold 24, and the inward-projecting tabs 42 of second (female) connecting port 40P would be first pushed elastically outwardly from the vertical plane, then snapping inwardly into grooves 44, locking first (male) connector port 38 to second (female) connector port 40, thereby locking manifold 24 to second manifold 24P. The foregoing type of fitting and variations that function similarly are mostly called here snap-lock joints or snap-lock connections.

Other mechanisms for connecting manifolds may also be used. For example, manifold connecting ports may comprise a female portion that slip fits into the interior of a male portion of an identical manifold. And manifolds may be secured to each other by fasteners rather than snap locks. For example, a manifold connecting port may alternatively comprise a flange that is fastened, clamped, or otherwise secured to a flange of a connecting port of an adjacent manifold not shown. In another alternative embodiment, not shown, the opposing connection ports of a manifold may have the same opening dimensions and a nipple will slip into the bore of each port to join two manifolds to each other, with optional use of fasteners.

Figure 8:
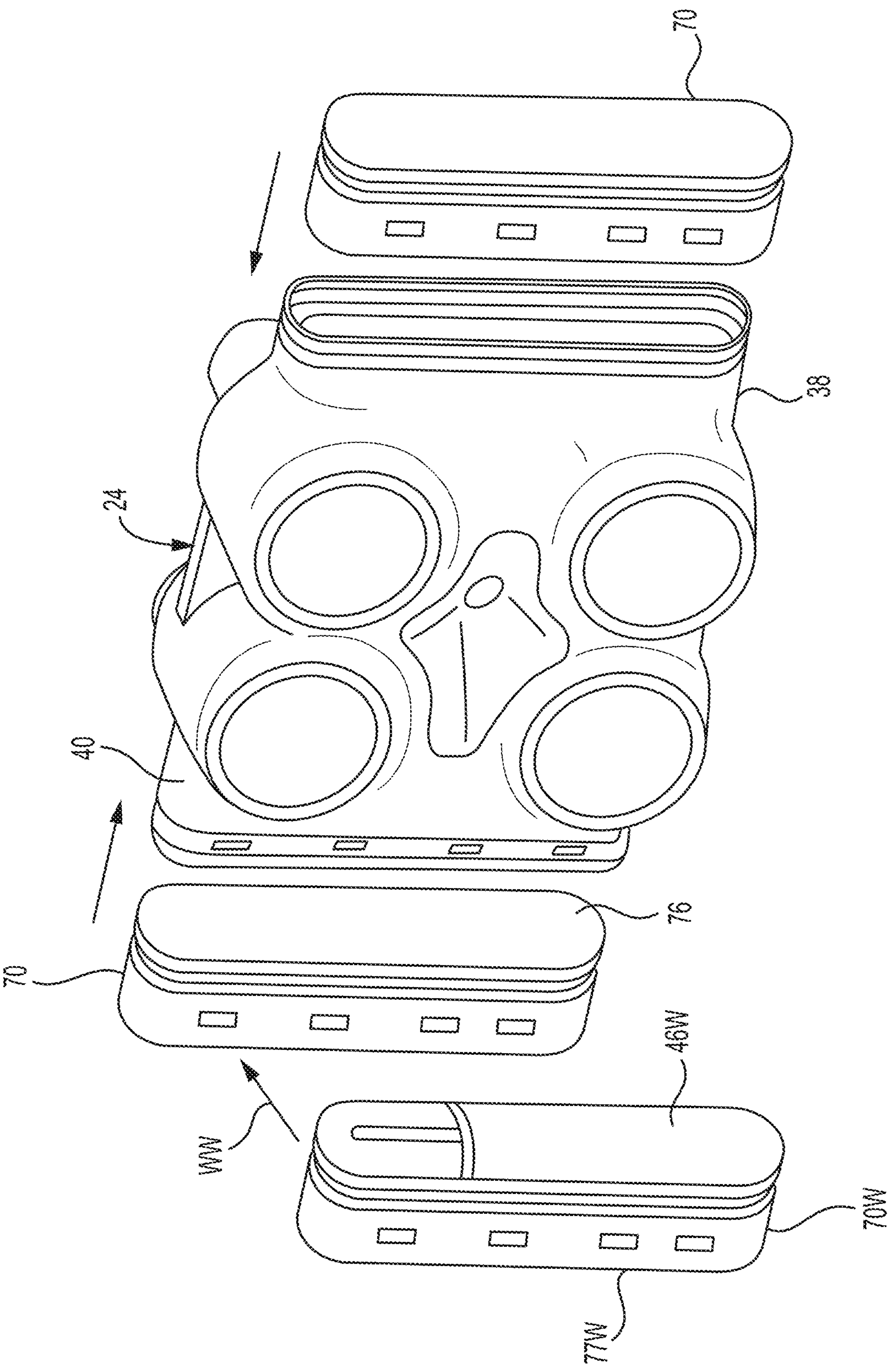
FIG. 8 illustrates a perspective view of a manifold and end caps being mated with the conduit ports of the manifold, consistent with embodiments of this disclosure.

To stop entry of soil during use of a system, the terminal ends of a manifold subassembly may be closed off by end caps 70 as shown in FIG. 8. End caps 70 that are also used for closing the open ends of conduits may be used. End caps 70 and their interaction with first connector port 38 and second connector port 40 of a manifold 24 are described below. (FIG. 8 also shows alternative closure, endcap 70W that acts as a weir due to partial removal of the endcap closed end 76. Weirs are discussed further below.)

In some embodiments, manifold 24 may include front wall 33 and rear wall 35 that are spaced apart along the z axis. Conduit ports 32 may extend from the rear wall 35. The front wall 33 may include four shallow domes 34 that impart strength and define locations where openings may be cut to receive inflow pipes of various diameters. The diameter of inflow pipes 36 may be approximately 2 inches, 3 inches, 4 inches, 5, inches, 6 inches, or of any suitable diameter. As shown in FIG. 1 and FIG. 2, wastewater inflow pipe 36 may be connected to the manifold 24 by cutting a hole in the upper left dome of a manifold. As shown in FIG. 7, a pin or depression 31 may be molded in the center of each shallow dome to facilitate use of a tool for cutting of an inflow pipe 36. In some embodiments, there may be fewer than four shallow domes 34. In some embodiments the front wall 33 of a manifold 24 may be in part or whole a plain or ribbed surface lacking shallow domes. In other embodiments, an inflow pipe 36 may be connected by an adapter 42 to a second (female) connector port 40, eliminating the cap 70 that is shown by arrow R as being suited for placement on a first end of the left-most manifold 24 depicted in FIG. 2.

With particular reference to FIG. 6, an embodiment of a manifold 24 may include a kiss-off 48, hereafter called wall tie 48, that structurally connects the front wall 33 and the rear wall 35. (A kiss-off, also called a tack-off, designates a reinforcing structure that is formed when portions of the opposing side walls of an article are deformed inwardly during plastic molding and become integral where they contact with each other.) The example wall tie 48 of manifold 24 depicted in FIGS. 3, 4 and 6 approximates two opposing truncated pyramids that are integral at their flat tops. Alternative configurations of wall tie that are familiarly associated with kiss-offs may also be used. Wall tie 48 provides strength to a manifold, enabling the use of walls having reduced weights. Wall tie 48 may be centered between the conduit ports 32 on the rear wall 35 and between the top two shallow domes and the bottom two shallow domes on the front wall 33. In some embodiments, a wall tie may be a separately formed part that is inserted between the first wall 33 and second wall 35 and connected thereto by pinning, adhesives, or other suitable connection means. The wall tie 48 has an inconsequential effect on wastewater flow and volume of internal cavity 39 of manifold 24.

In other embodiments, manifold 24 may not include a wall tie or some other structure that joins the front wall 33 to the rear wall 35. This may be accomplished by strengthening the walls by, for example, increasing the thickness of the walls, incorporating stiffening ribs, incorporating corrugations, or other suitable means.

The embodiment depicted in FIG. 7 also depicts a weir 46 that may be disposed within the opening of first (male) connector port 38 of manifold 24. The presence of weir 46 will cause wastewater to accumulate in the conduits 30 and manifolds 24 which are upstream of the manifold 24 having the weir within a wastewater treatment system 20. Since weir 46 is positioned within the interior of the first (male) connector port 38 of manifold 24, it does not impede connection to first (male) connector port 38 of the second (female) connector port 40P of the "being-mated" manifold 24P in FIG. 7. Manifolds, when blow molded, may have closures across the openings of first (male) connector port 38 and second (female) connector port 40; those closures being subsequently severed at the conclusion of the blow molding process. A weir 46 may be a portion of such severed closure, or a weir may be a separately formed part.

With reference to FIG. 8, in some embodiments a weir 46A may be placed in the female connector port 40. End cap 70W is a modification of endcap 70. The as-blow-molded closed end 76 of an endcap 70 has been partially removed by cutting and discarded, thereby creating weir 76W. The open end 77W of endcap 70W may have the same shape as second (female) connector port 40 of manifold 24, thus allowing the connection of manifold 24 to the first (male) connector port 38 of an adjacent identical manifold 24.

Figure 18:
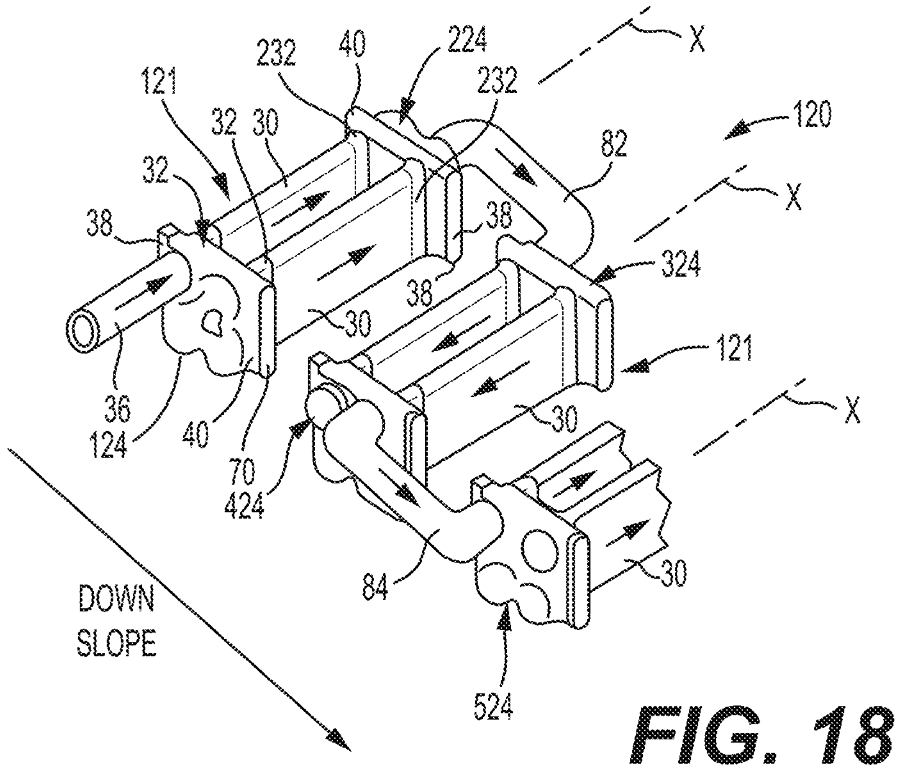
FIG. 18 illustrates a perspective view of a wastewater treatment system wherein manifold and conduit subsystems are interconnected by transfer pipes that result in serial flow through the system, consistent with embodiments of this disclosure.
Figure 19:
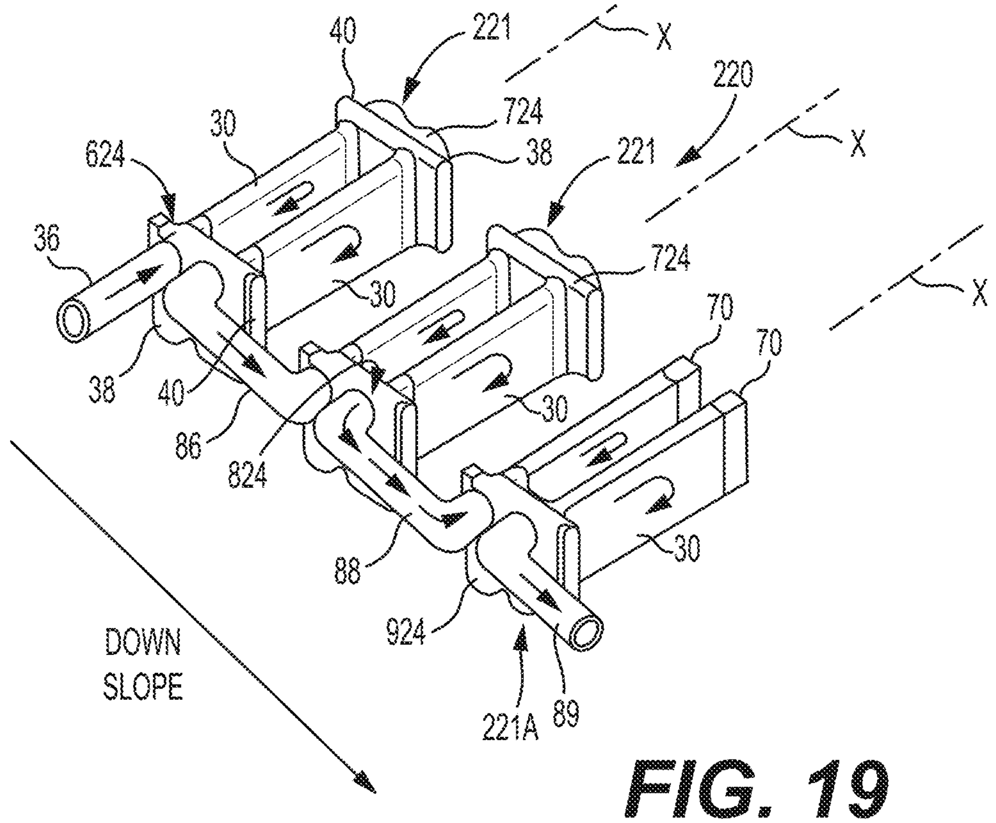
FIG. 19 illustrates a perspective view of a wastewater treatment system wherein manifold and conduit subsystems are interconnected by transfer pipes that result in parallel flow through the subsystems, consistent with embodiments of this disclosure.

In some circumstances, wastewater treatment systems may be installed on sloped terrain. When that is the case, one or more pairs of conduits 30 will be at a lower elevation than the conduits of an adjacent upstream part of the system. FIG. 18 and FIG. 19 show system embodiments suitable for sloped terrain. In the embodiment depicted in FIG. 18, systems 120, 202 include subsystems 121, 221. Subsystems 121, 221 include spaced apart identical manifolds (but for the cut-outs for connection of a transfer pipe) that are connected by two conduits. In these embodiments, the first connector ports 38 and second connector port 40 are not used, so they are closed by end caps 70, or alternatively may be closed by an integral closure.

In some embodiments, and as depicted in FIG. 18, inflow pipe 36 may deliver wastewater to a first manifold 124. As indicated by the arrows in FIG. 18, water may flow horizontally and lengthwise through conduits 30, which are connected to the conduit ports 32 and extend from the rear wall of first manifold 124, to second manifold 224 where the distal ends of conduits 30 are connected to conduit ports 232. Note that the rear walls of the spaced apart manifolds of subsystem 121 face each other in this embodiment, such that the lengthwise x axes of the subsystems 121 are parallel and laterally spaced apart. In this embodiment, it is assumed that during use water will not entirely disperse into the soil surrounding each pair of conduits 30. Thus, water flowing into the first pair of conduits 30 from first manifold 124 will rise to the level of an upper portion, for example one of the uppermost shallow domes of second manifold 224, whereupon the water flows downwardly through U-shaped transfer pipe 82 to an upper portion, for example an uppermost shallow dome-opening of third manifold 324, which is at a lower elevation than second manifold 224. The water may then flow horizontally through conduits 30 to fourth manifold 424. When water rises to the level of an upper portion, for example an uppermost shallow dome of fourth manifold 424, where a U-shaped transfer pipe 84 is connected to the fourth manifold 424. Water may then flow downhill through U-shape transfer pipe 84 to an upper portion, for example an uppermost shallow dome opening of fifth manifold 524 which is at a lower elevation than manifold 424, and then into further conduits 30, and so forth. The foregoing flow through the embodiment of system 120 depicted in FIG. 18 is characterized as "serial flow." System 120 may alternatively be used on flat terrain, particularly when field conditions or regulations make desirable nearly filling a first pair of conduits with water before feeding the next pair of conduits.

In another embodiment, as depicted in FIG. 19, a wastewater treatment system 220 may be useful for installation on a sloped terrain. System 220 may include a plurality of subsystems 221 that are identical, have parallel lengthwise x axes and are laterally spaced apart. The manifolds 624, 724, 824, 924 of the subsystems 221, except for the cut-outs for pipe connections, may be identical. Each manifold has closures on first connector port 38 and second connector port 40. An inflow pipe 36 may be incorporated to deliver wastewater to first manifold 624 through a cut-out in a first upper shallow dome of the manifold 624. Water may flow from first manifold 624 into the proximal ends of a first pair of conduits 30, then horizontally to the conduit distal ends which are closed off by second manifold 724. Under certain conditions during use of system 220, water flowing into any pair of conduits may be more than can percolate through the perforated walls of conduits 30 into the surrounding soil. Thus, water may accumulate within the first pair of conduits 30 as indicated by the curved arrows and may rise to the level of a second upper shallow dome of manifold 624 where U shape round transfer pipe 86 is connected to the second upper shallow dome of first manifold 624. Water may flow through conduits 30 between first manifold 624 and second manifold 724 but may be prevented from flowing out the distal end of the second pair of conduits by second manifold 724. Water then flows through pipe 86 to third manifold 824 at a lower elevation and into a port cut in a first upper shallow dome thereof; then into the second pair of conduits 30 that are connected to conduit ports of manifold 824. Water rises to the level of a second upper shallow dome of third manifold 824, and via U-shape transfer pipe 88 into fourth manifold 924 and the conduits 30 that are connected to the fourth manifold 924. The subsystem 221 that comprises fourth manifold 924 may be identical to the subsystem 221 that comprises third manifold 824. In some embodiments, as depicted in FIG. 19, the distal ends of conduits which extend from fourth manifold 924 may be closed by end caps 70 rather than by another manifold. In an alternative embodiment of system 220, not shown, all the distal ends of conduits 30 may be closed by end caps. When water rises to the level of a second upper shallow dome on manifold 924, water may flow through transfer pipe 89 to possible further manifold and conduits, not shown. The flow through the system 220 depicted in FIG. 19 may be characterized as "parallel flow." System 220 may alternatively be used on flat terrain, particularly when field conditions or regulations make filling a first pair of conduits with water before feeding the next pair of conduits.

In some embodiments, modifications of system 220 may comprise conduits having distal ends are closed off by manifolds, by end caps, or by a mixture of the two. The types of closures used at the distal ends of conduits 30 in various embodiments may differ from manifolds and end caps. The types of closure that can be used are not limited by this disclosure.

Figure 9:
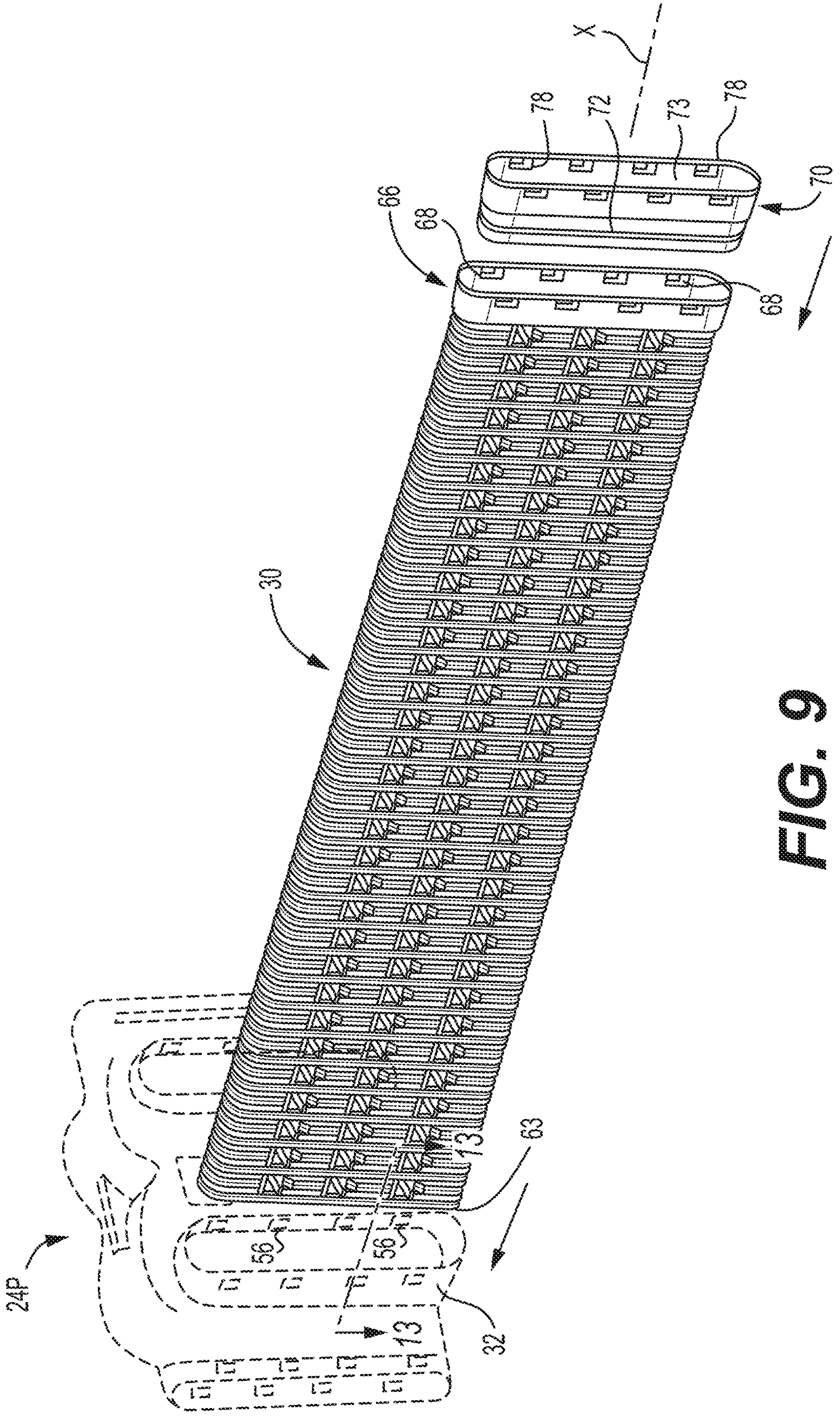
FIG. 9 illustrates a perspective of a conduit connecting to a manifold at its proximal end and with an end cap at its distal end, consistent with embodiments of this disclosure.

In some embodiments, as shown in FIG. 9, a conduit 30 may be situated for connection to conduit port 32 of a manifold 24P, shown in cross-hatching. The conduit 30 may have a plain end 63 at its proximal end configured to connect to conduit port 32. The conduit 30 may have a distal end configured to receive integral fitting 66. Integral fitting 66 may include opposing side tabs 68 that project inwardly from the straight sides of the oblong concavity lengths (and not from the rounded upper and lower ends of the conduit cross section). In the embodiment depicted in FIG. 9, endcap 70 is configured to connect to integral fitting 66, present at the proximal end of conduit 30, to close the opening at the proximal end of conduit 30. Alternatively, the distal end of another conduit may be connected to integral fitting 66. In some embodiments, an oblong short nipple (not shown) may slip fit within the proximal end of a conduit 30 and the distal end of another conduit 30 to connect the two conduits. When one or more conduits 30 are connected in series, a multi-piece conduit may be formed that functions substantially the same as a one-piece conduit having the same length. Accordingly, a conduit may include a single piece conduit or a multi-piece conduit.

Figure 10:
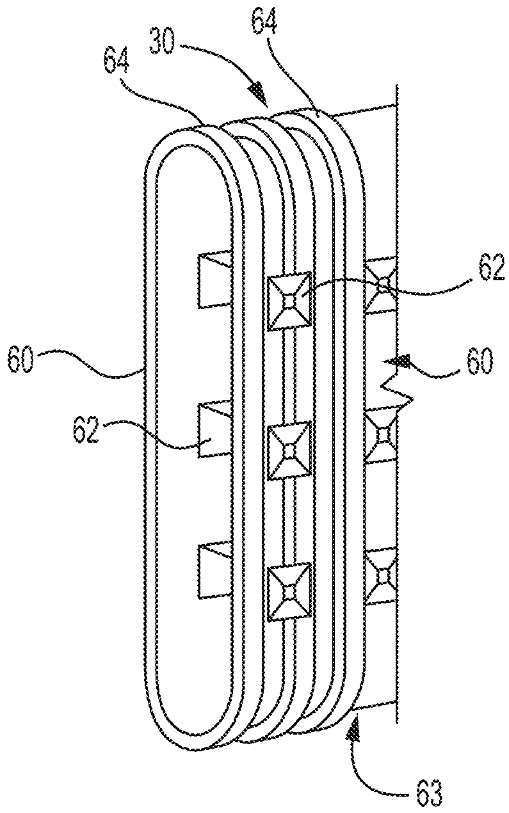
FIG. 10 illustrates a perspective view of an end of a conduit, consistent with embodiments of this disclosure.
Figure 11:
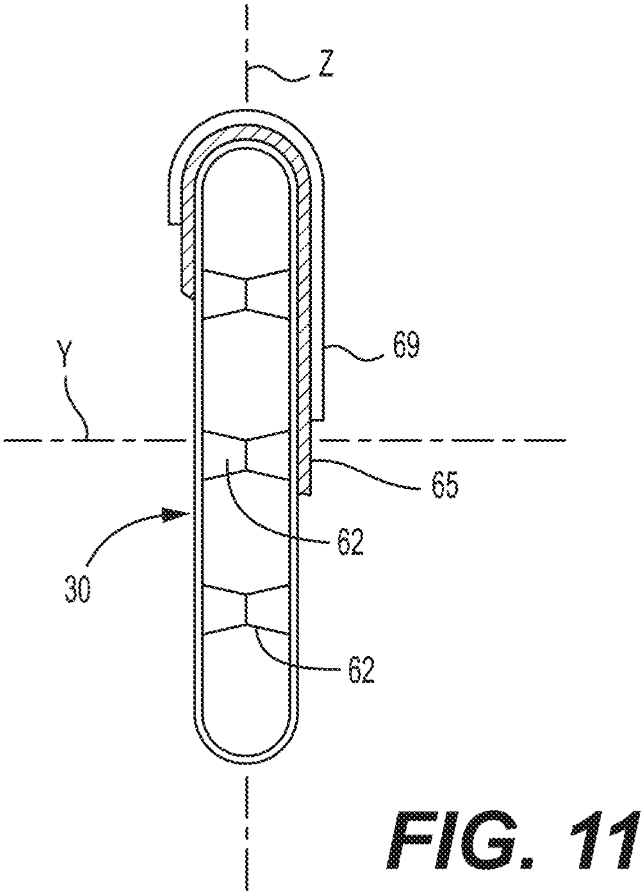
FIG. 11 illustrates an end view of a conduit showing portions of geogrid and geotextile that encircle the conduit, consistent with embodiments of this disclosure.

FIG. 10, depicts an embodiment of a proximal end 63 of conduit 30. The proximal end 63 may include a circumscribing rib 64 configured to engage the inward projecting tabs 56 of a conduit port 32 (not shown in FIG. 10). FIG. 11 shows conduit 30 in end view.

In some embodiments, conduit 30 may have a vertical height of about 13 inches and a width (vertical wall spacing) of about 2 inches. Each vertical wall 60 of conduit 30 may have ribs 64 that run vertically and across the top and bottom of the conduit 30, thereby circumscribing the conduit. Ribs 64 may define peaks and valleys on the surface of the conduit 30 and impart strength to conduit 30. Ribs 64 may also provide gripping surfaces for the projecting tabs 56 of conduit ports 32 or integral fittings 66 or endcaps 70.

The opposing vertical walls 60 of a conduit 30 may be connected to each other by a plurality of kiss-offs 62, also called conduit ties 62. On the exterior of the vertical walls, conduit ties 62 present as depressions. In some embodiments, there are three vertically spaced apart conduit ties 62 between each of the circumscribing ribs 64. Conduit ties 62 provide structural strength to the conduit 30, helping to resist soil forces pressing inwardly on the vertical walls. In some embodiments, conduit ties 62 may be spaced apart about 1.5 inches. In other embodiments, conduit ties may be spaced apart about 1.0 inches, 1.25 inches, 1.75 inches, or 2.0 inches, or any other suitable distance.

In some embodiments, conduit 30 may have a plurality of perforations, not shown in the figures, enabling wastewater to flow outwardly from the conduit interior into the surrounding soil. Such perforations may be saw cut after the conduit has been molded. In some embodiments, perforations may be slits and may be situated adjacent to the bases of the circumscribing ribs 64. Each slit may be about 0.1 to 0.2 inch in width and one or more inch in length. In some embodiments, slits may be spaced apart along the length of the conduit by about three inches and may be randomly spaced apart vertically. In other embodiments, slits may be spaced apart along the length of the conduit by about one inch, 1.5 inches, two inches, 2.5 inches, or any other suitable distance. In various embodiments, conduits 30 extending from manifold 24 may have different dimensions and strengthening features instead of or in addition to circumscribing ribs and conduit ties. Conduits may also have other kinds of perforations, for instance, circular openings, rectangular openings, or oblong openings, and the size of such perforations may also vary. In some embodiments, the location of perforations on conduits 30 may not be uniformly spaced. In other embodiments, perforations may be located exclusively along a bottom portion of each conduit 30, exclusively along a top portion of each conduit 30, or exclusively on one side of each conduit 30. In yet other embodiments, only one of every two conduits 30 situated within s subsystem 121, 221, may include perforations, the other of the two conduits 30 having no perforations.

Figure 13:
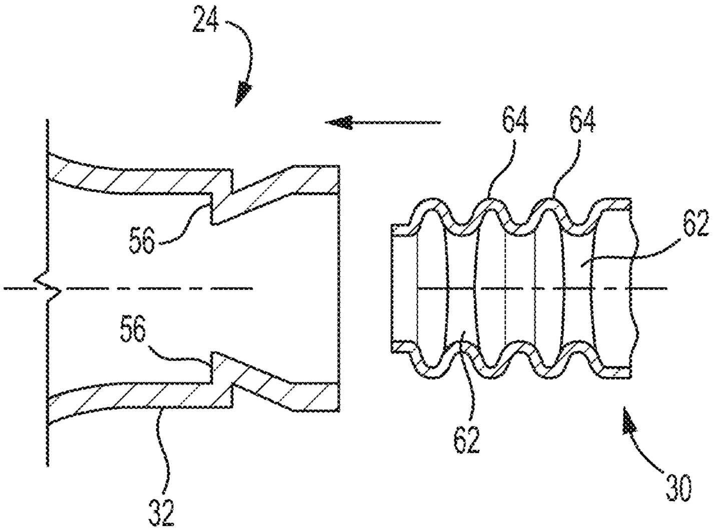
FIG. 13 illustrates an example of a connection between an end of a conduit and a conduit port of a manifold, consistent with embodiments of this disclosure.

With reference to the embodiment depicted in FIG. 9, each conduit 30 may connect at the conduit proximal end 63 (the plain end 63) to a conduit port 32 of a manifold 24 by slipping into the opening in conduit port 32. The ribbed end of a conduit may be engaged by projecting tabs 56 that project inwardly into the opening of a conduit port 32 from both vertical sides of the conduit port 32. As depicted in the partial cross section of FIG. 13, in some embodiments, upon first insertion of a ribbed oblong-shaped conduit 30 into the opening of a conduit port 32 of manifold 24, the proximal end 63 (or plain end 63) of the conduit 30 may elastically deflect inwardly while the projecting tabs 56 around the opening of conduit port 32 may elastically deflect outwardly; then, as conduit 30 is further inserted, the walls and projecting tabs 56 spring toward each other to near their original positions; and the combined motions result in the projecting tabs of the conduit port 32 being engaged with a rib 62 at the proximal end 63 of the conduit 30. A feature of the foregoing way of connecting a conduit 30 to the manifold 24 is that a conduit 30 can be cut to a desired length, with the cut end being a proximal end 63 (or plain end 63) that is received within an opening of a conduit port 32. Male connector port 38 and female connector port 40 may have alternative connection configurations for connecting to manifolds 24, including different arrangements of tabs and engagement features.

Conduits 30 may alternatively be secured without snap lock features. An opening in a manifold conduit port 32 may be configured to receive a plain oblong cross section nipple that slips within the opening of the proximal end of a conduit 30 (with suitable cutouts at the locations of conduit ties 62 as needed). Alternatively, an oblong cross section sleeve may be configured to slip over an exterior of a conduit 30 and the exterior of the conduit port 32. Fasteners and the like may be used in both instances to secure the conduit 30 and manifold 24 to the nipple/sleeve.

During use, a conduit 30 may be wrapped with material to both hinder intrusion of surrounding media and enable wastewater that flows through the perforations or vertical slits to be distributed into the soil surrounding the conduit 30. FIG. 11 depicts an embodiment of a conduit 30 that has a first layer 65 of geogrid and an overlying layer 69. In some embodiments, the geogrid is a moderately stiff plastic mesh. In some embodiments, overlying layer 69 is a plastic geotextile that has openings small enough to hinder intrusion into the conduit 30 of finer particles from the surrounding permeable media, which may include, for example, soil. Geogrid layer 65 may also help enable flow of wastewater vertically and lengthwise along the conduit exterior after the wastewater flows through the perforations in the wall of the conduit 30. The overlying layer 69 limits the extent to which surrounding soil can push overlying layer 69 into tight contact with the exterior surface of the conduit 30.

In some embodiments, end cap 70 may be configured to be inserted into internal fitting 66 at a distal end of conduit 30 and can also be used to close off conduit port 32 of a manifold 24 where no conduit 30 is connected to the manifold 24. End cap 70 may also be used to close the end of a conduit that lacks an integral fitting 66, which may include an as-molded proximal end 63 (or plain end 63) of a conduit 30 that has been severed to shorten its length.

Figure 17A:
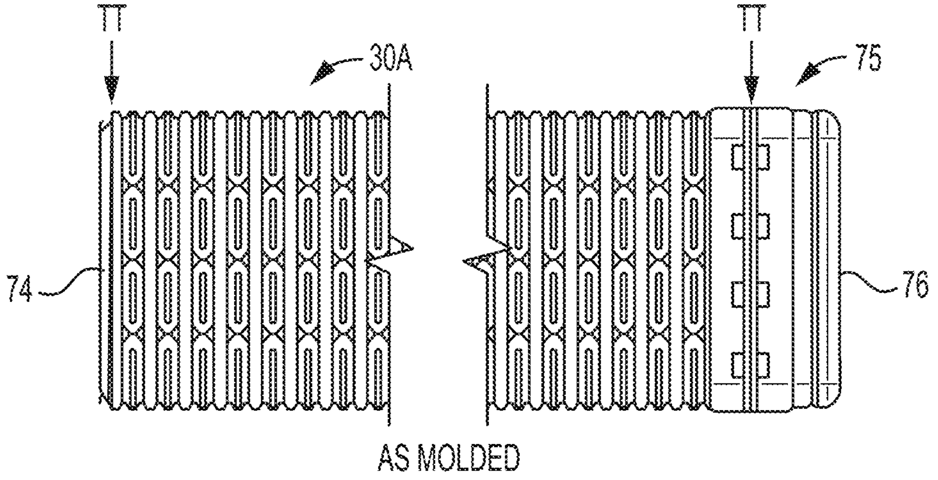
FIG. 17A illustrates an as-molded precursor having a conduit with a fitting at one end and an endcap at the opposite end, consistent with embodiments of this disclosure.
Figure 17B:
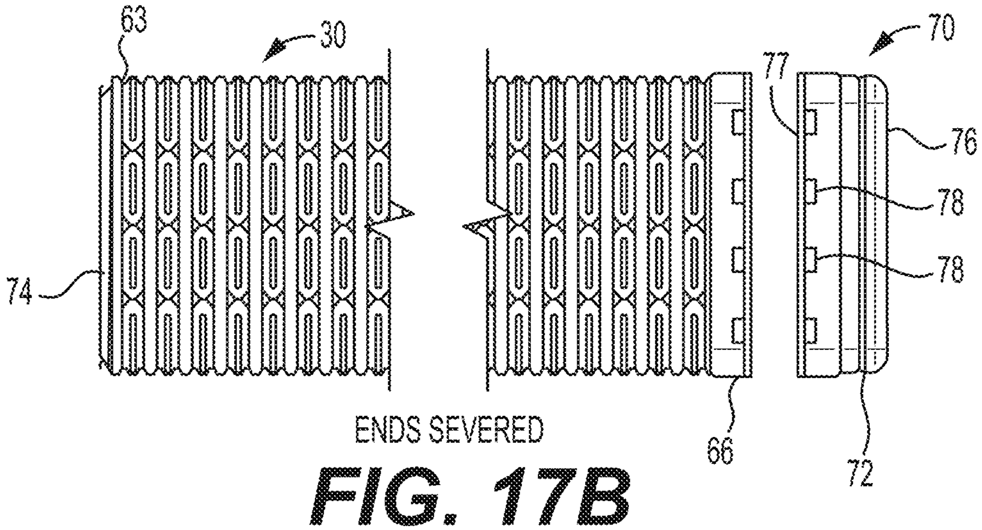
FIG. 17B illustrates the as-molded precursor of FIG. 17A in which the end cap has been severed, consistent with embodiments of this disclosure.
Figure 17C:
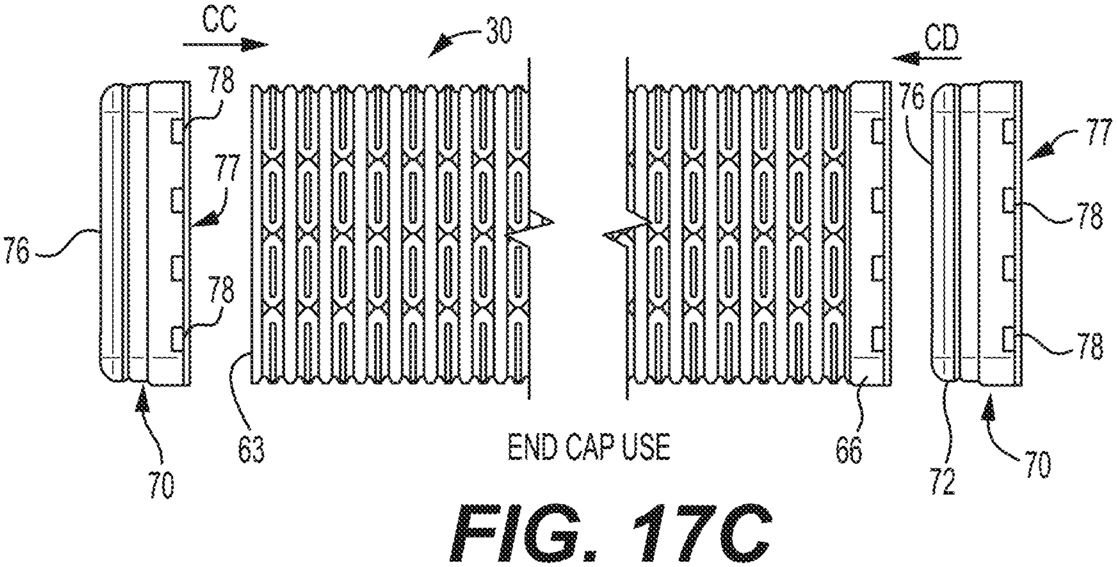
FIG. 17C illustrates the as-molded precursor of FIG. 17C in which the end cap has been severed and is being used as a closure at one end of the conduit and an end cap at the opposite end of the conduit, consistent with embodiments of this disclosure.

FIGS. 17A, 17B, and 17C depict the sequential steps by which a conduit 30 and multipurpose end cap 70 are formed. FIG. 17A depicts an article, precursor 30A, that has been formed by blow molding. Arrows TT point to locations where the precursor is intended to be cut. One end of the precursor 30A comprises a closure 74 which may be severed and discarded. The other end of precursor 30A comprises precursor fitting 75.

FIG. 17B depicts the separated parts, namely closure 74, conduit 30, and end cap 70 (which may also be characterized as a closure). Endcap 70 may have the shape of an oblong cup, comprising a mouth end 77, a closed end 76, an oblong shaped internal cavity 73 (see FIG. 9), opposing side tabs 78 that project inwardly from the straight sides of the oblong concavity lengths (and not from the rounded upper and lower ends of the conduit cross section), and opposing side vertical running exterior grooves 72 (which as shown may connect to each other and run entirely around the oblong exterior of the conduit).

FIG. 17C depicts how conduit 30, when part of a wastewater subsystem, may have either one of its open ends closed by an endcap 70. As shown by arrow CC, in one example, the severed open proximal end 63 (or plain end 63) of conduit 30 may be closed by slipping the mouth end 77 of endcap 70 over the proximal end 63 of conduit 30, whereupon the inward projecting endcap tabs 78 will engage with the external ribbing of the conduit 30 to hold the endcap 70 in place. As shown by arrow CD, in another example, the closed end 76 of endcap 70 may be inserted into the interior of integral fitting 66 of conduit 30, to close off the conduit 30. The latter use is also shown in FIG. 9.

In summary, an article may be formed that is severable into a conduit with a fitting at one end and an endcap. The endcap may be configured to close either the fitting (or distal) end of the conduit or the opposing proximal end (or plain end) of the conduit. When the endcap closes the fitting end, it is held in place by tabs within the fitting. When the endcap closes the proximal end, it is held in place by tabs within the endcap.

Figure 14:
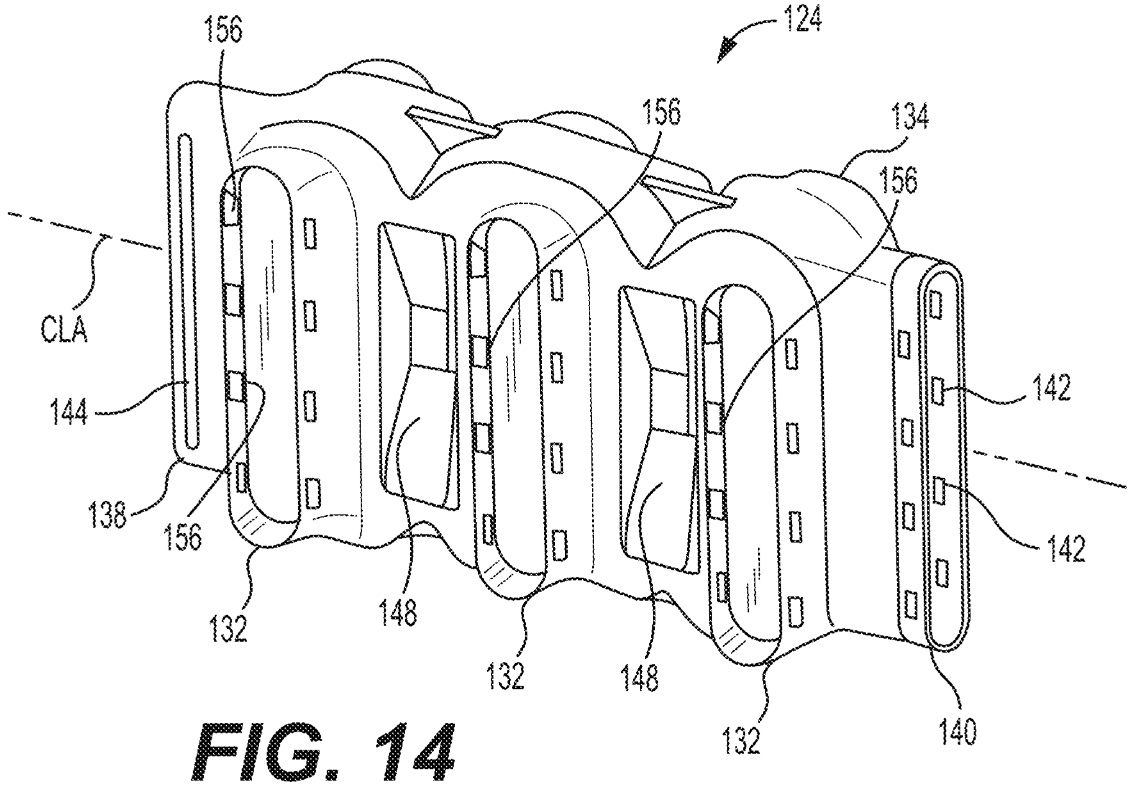
FIG. 14 illustrates a perspective view of the rear of a manifold having three conduit ports, consistent with embodiments of this disclosure.
Figure 15:
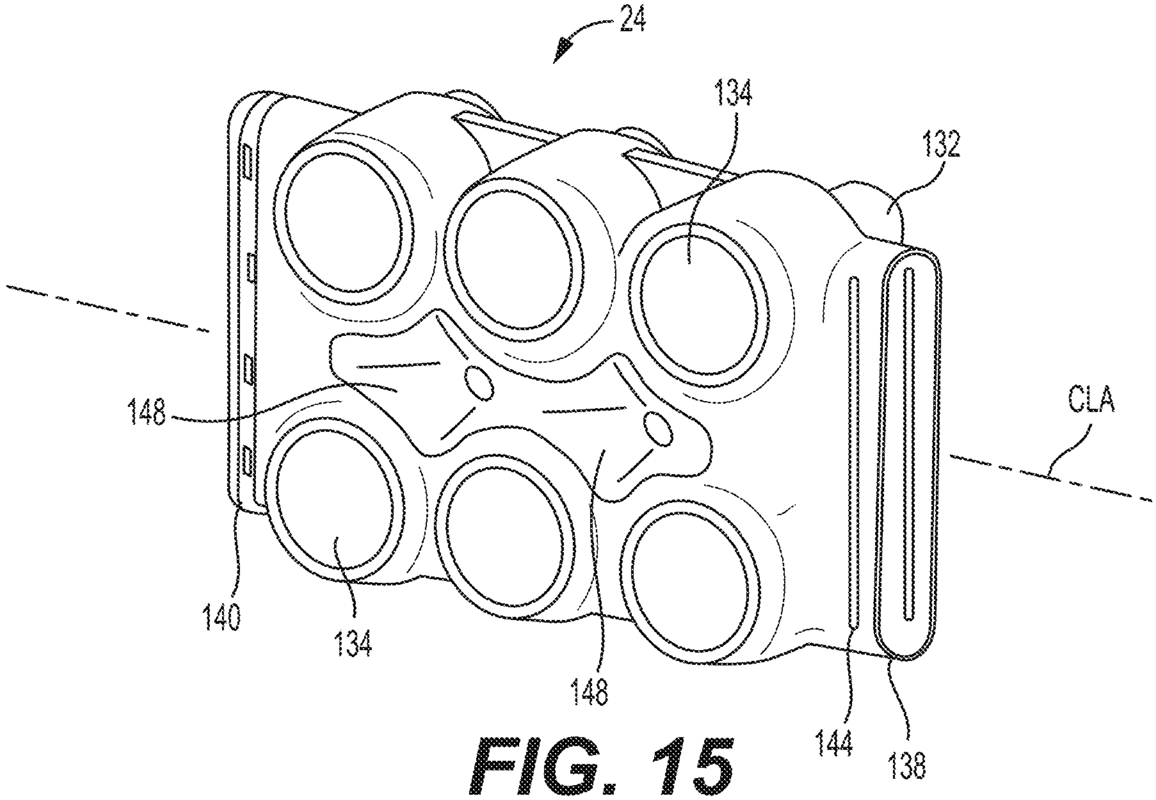
FIG. 15 illustrates a perspective view of the front of the manifold of FIG. 14, consistent with embodiments of this disclosure.

In some embodiments, a manifold 24 having more than two ports may be a substitute for dual-port manifold 24, as depicted in FIGS. 3, 4, and 5. FIG. 14 depicts the second side of manifold 124, an embodiment that comprises three conduit ports 132 and is configured to receive three conduits 30 rather than two conduits. FIG. 15 shows the six shallow domes 134 on the first side of manifold 124. Disposed along central lengthwise axis CLA is male connector port 138 which is receivable within a female connector port 140 of an identical manifold 124. Two wall ties 148 connect the front and rear walls of the manifold. Manifold 124 can be combined with conduits 30 and used in the same way as has been described for manifolds 24 in other embodiments disclosed herein.

Figure 16:
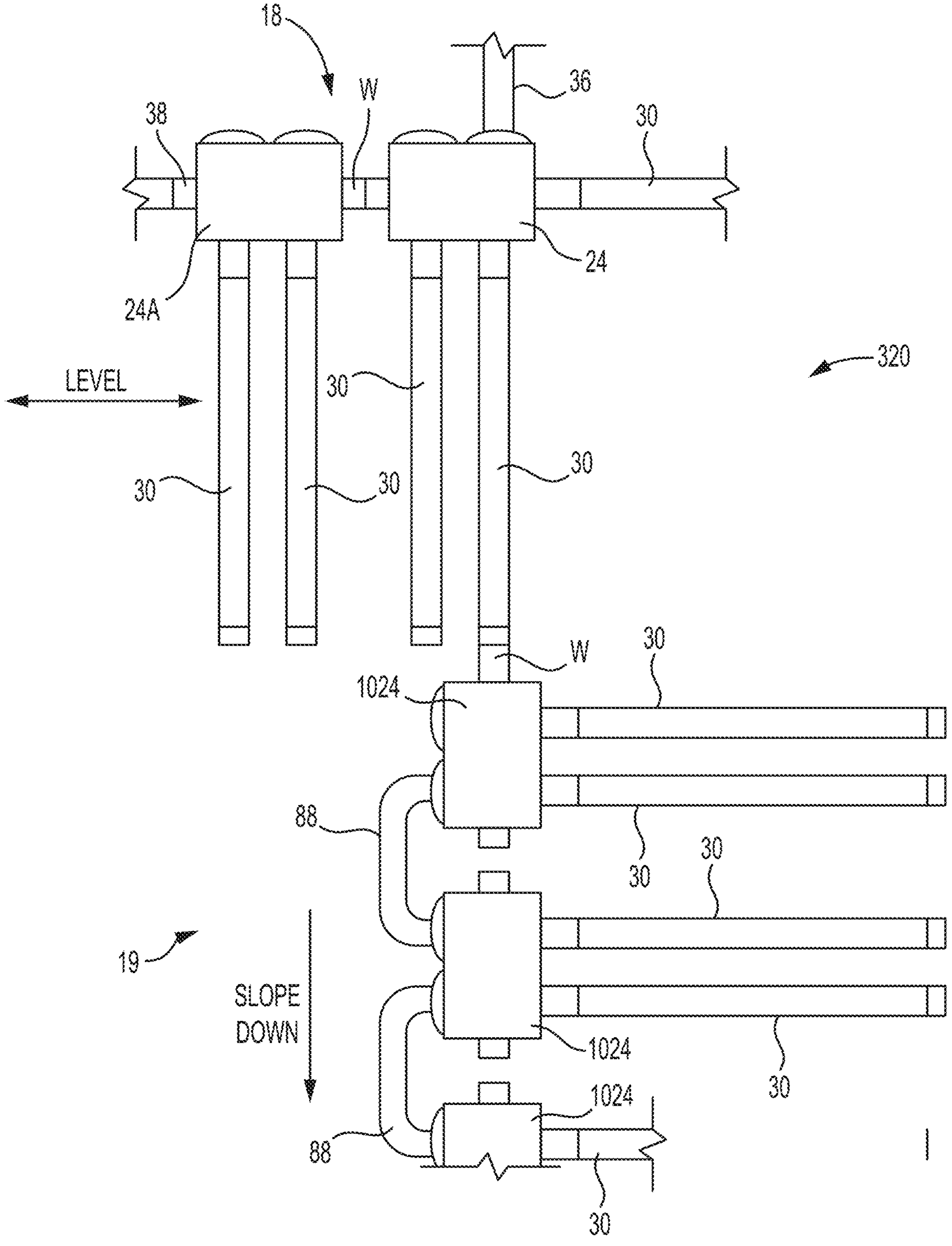
FIG. 16 illustrates a plan view of a wastewater system, consistent with embodiments of this disclosure.

FIG. 16 is a simplified plan view of a portion of an example of a wastewater treatment system 320 that illustrates further the flexibility provided by some embodiments. During use, inflow pipe 36 may be configured to bring wastewater from a source to a first subsystem 18 comprising a series of manifolds that are disposed on level terrain. A conduit 30 may runs from first subsystem 18 to a second subsystem 19 comprising a second series of manifolds that are disposed along a slope. Weirs may be interposed at different places in the wastewater treatment system 320, indicated by the letter W in FIG. 16. During use, weir W may interrupt the flow of wastewater within wastewater treatment system 320 and may serve to control to flow of wastewater through the system.

More specifically, in the embodiment depicted in FIG. 16, and in reference to first subsystem 18, a first portion of the wastewater delivered to the intake manifold 24 is able to flow to manifold 24A via the manifold connecting ports. Each manifold 24, 24A has conduits 30 connected thereto. Other manifolds may be connected via port 38 to manifold 24A. Another second portion of the water delivered to intake manifold 24 may flow through a conduit 30 which has an end connected to first manifold 1024 of second subsystem 19. A weir may be positioned at an intake port of manifold 1024. Second subsystem 19 may be configured like and may function like system 220 of FIG. 19. In brief, water may accumulate in conduits 30 that extend from first manifold 1024; water may then flow through pipe 88 to a second lower-elevation manifold 1024 and its interconnected conduits 30, and so on, down the slope.

An embodiment of the present disclosures also includes a method of forming an oblong cross section ribbed conduit and an endcap configured for closing either end of the conduit, which comprises blow molding a precursor article having an oblong cross section characterized by a major axis, opposing-side walls parallel to the major axis, internal kiss offs connecting the walls, a plurality of circumscribing lengthwise-spaced apart ribs, a first end that comprises a closure and a second end having an integral precursor fitting; converting the precursor into a conduit and an end cap by: (i) severing the closure from the precursor first end to form a conduit having a plain end; and (ii) severing the second-end integral precursor fitting into two parts, wherein a first part thereof remains integral with the conduit as a conduit fitting having internal tabs configured for snap lock mating with the plain end of an identical conduit, and wherein a second part comprises an endcap configured for snap lock mating with said conduit fitting or with said plain end.

In another embodiment, a molded plastic conduit may be configured to receive wastewater within a hollow interior thereof and to disperse wastewater within soil, the conduit having a proximal end, a distal end with an integrally molded fitting, an oblong cross section wall having a plurality of circumscribing ribs, and a plurality of perforations; and a plurality of conduit ties, the integrally molded fitting having snap lock features shaped to snap lock mate with the proximal end of a like conduit.

In yet another embodiment, the combined part for use in wastewater treatment may include a molded plastic conduit having a proximal end, a distal end with an integrally molded fitting, an oblong cross section wall having a plurality of circumscribing ribs, and a plurality of perforations; and a plurality of conduit ties, the integrally molded fitting having snap lock features shaped to snap lock mate with the proximal end of a like conduit. The molded plastic conduit may be combined with an end cap having an open end and a closed end; the end cap closed end configured to snap lock with said conduit distal end fitting and the end cap open end configured to snap lock engage with the proximal end of the conduit.

It should be noted that the products and/or processes disclosed may be used in combination or separately. Additionally, embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the prior detailed description be considered as exemplary only, with the true scope and spirit being indicated by the following claims.

The examples presented herein are for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

FURTHER EXAMPLE EMBODIMENTS

What follows below is a listing of examples of sets of embodiments focusing on one or more aspects of the different embodiments described above. Each of the different sets of embodiments provide improvements to the technology of onsite subsurface wastewater treatment systems and components thereof. As such, within each further embodiment heading are numbered aspects describing a specific technological application of one or more onsite subsurface wastewater treatment systems and components that improve or otherwise enhance these technical fields, as explicitly explained and supported by the disclosure above. Each numbered aspect appearing below a particular heading may make reference to other numbered aspects that appear below that particular heading in a dependent relationship.

Further Embodiment A

Clause 1: A manifold of a subsurface wastewater treatment system, comprising: a front wall having an upper end and a lower end; a rear wall having an upper end and a lower end; an internal cavity between the front wall and the rear wall, wherein the front wall and the rear wall are integral with each other at respective upper ends and lower ends; a length and a central lengthwise axis (CLA), the CLA extending in a horizontal plane along the length of the manifold; one or more conduit port extending from the rear wall, each of the one or more conduit ports defining an opening connected to said internal cavity; a first connector port configured at one end of the manifold and defining an opening connected to said internal cavity, the CLA extending through the first connector port; and a second connector port configured at an opposite end of the manifold and defining an opening connected to said internal cavity, the CLA extending through the second connector port.

Clause 2. The manifold of the embodiment disclosed in clause 1, comprising a first conduit port and a second conduit port, wherein each of the first conduit port and the second conduit port has a periphery running around an oblong shaped opening that has a vertical major axis and a horizontal minor axis, each of the first conduit port and the second conduit port being configured to receive a conduit having an oblong shape.

Clause 3. The manifold of the embodiment disclosed in clause 2, wherein both a first conduit configured to be received by the first conduit port and a second conduit configured to be received by the second conduit port extend from the manifold in a direction perpendicular to the CLA.

Clause 4. The manifold of the embodiment disclosed in clause 2, wherein one or more of the first connector port and the second connector port has the same shape as the shape of to a first conduit port and the second conduit port.

Clause 5. The manifold of the embodiment disclosed in clause 1, further comprising a wall tie extending within said internal cavity from the front wall of the manifold to the rear wall of the manifold at a location between said first conduit port and said second conduit port.

Clause 6. The manifold of the embodiment disclosed in clause 1, wherein the front wall includes a plurality of shallow domes, each shallow dome shaped to receive an inlet pipe.

Clause 7. The manifold of the embodiment disclosed in clause 1 wherein each of the first connector port opening and second connector port opening has an oblong shape having a vertical major axis and a horizontal minor axis; wherein the first connector port is configured to fit within the second connector port of a first different, identical manifold.

Clause 8. The manifold of the embodiment disclosed in clause 7 wherein the first connector port is configured to connect to the second connector port of a first different, identical manifold and the second connector port is configured to connect to a first connector port of second different, identical manifold.

Clause 9. The manifold of the embodiment disclosed in clause 8, wherein the connections are snap lock connections.

Clause 10. The manifold of the embodiment disclosed in clause 8, wherein the first connector port includes a plurality of tabs that project inwardly within the first connector port opening, and wherein each second connector port comprises opposing side external grooves configured to interact with said plurality of tabs when a first connector port is connected to a second connector port of a first different, identical manifold.

Further Embodiment B

Clause 1. A subsystem for subsurface treatment of wastewater, comprising: a first manifold having: a central lengthwise axis (CLA) extending in a horizontal plane along a length of the manifold, a front wall having an upper end and a lower end, a rear wall having an upper end and a lower end, wherein the front wall and the rear wall are integral with each other at respective upper ends and lower ends and wherein portions of the front wall and rear wall are spaced apart to define an internal cavity configured to hold; at least a first conduit port and a second conduit port extending from the rear wall, each of the first conduit port and the second conduit port defining an opening connected to said internal cavity; wherein each of the first conduit port and the second conduit port has a periphery running around an oblong shaped opening having a vertical major axis and a horizontal minor axis, each of the first conduit port and the second conduit port being shaped for to receive conduit having an oblong-shaped cross section; and at least a first connector port and an opposing second connector port, each of the first connector port and the second connector port extending along said CLA and defining an opening facing along said CLA that is connected to said internal cavity; wherein each of the first connector port opening and second connector port opening has an oblong shape that has a vertical major axis and a horizontal minor axis; wherein the first connector port is configured to fit within a second connector port of a second manifold being identical to the first manifold; and at least a first conduit and a second conduit, each conduit having a proximal end and a distal end and an oblong-shaped cross section, the first conduit and second conduit being configured to receive and disperse wastewater, wherein the proximal end of the first conduit is connected to said first conduit port of the first manifold and the proximal end of the second conduit is connected to the second conduit port of the first manifold.

Clause 2. The subsystem of the embodiment disclosed in clause 1, wherein the first conduit and second conduit each have a circumscribing rib and perforations.

Clause 3. The subsystem of the embodiment disclosed in clause 2, wherein the first conduit port connects to the proximal end of the first conduit by a snap lock and the second conduit port connects to the proximal end of the second conduit port by a snap lock.

Clause 4. The subsystem of the embodiment disclosed in clause 1, wherein the first connector port and the second connector port of the first manifold are configured to snap lock together respectively with the second connector port and the first connector port of the second manifold being identical to the first manifold.

Clause 5. The subsystem of the embodiment disclosed in clause 1 wherein a proximal end of third conduit connects with one of the first connector port or the second connector port of the first manifold.

Clause 6. The subsystem of the embodiment disclosed in clause 1 further comprising an endcap, the endcap connecting to the distal end of at least one of the first conduit and the second conduit.

Clause 7. The subsystem of the embodiment disclosed in clause 1, wherein the distal end of one or more of the first conduit and the second conduit comprises an internal fitting.

Clause 8. The subsystem of the embodiment disclosed in clause 2 wherein each of the first conduit and the second conduit is wrapped in geogrid.

Clause 9. The subsystem of the embodiment disclosed in clause 8, wherein each of the first conduit and the second conduit further comprises a geotextile overlay surrounding the geogrid wrapping.

Further Embodiment C

Clause 1. A system for subsurface treatment of wastewater, comprising: one or more manifolds, each manifold having: a central lengthwise axis (CLA) extending along a length of the manifold; a front wall; a rear wall connected to the front wall; a first end; a second end opposite the first end, wherein the front wall, rear wall, first end, and second end define an internal cavity configured to receive and hold wastewater; at least first and second conduit ports extending from the rear wall, spaced apart along said CLA, each of the at least first and second conduit port defining an opening leading to said internal cavity, the opening having a vertical major axis and a horizontal minor axis; and, a first connector port located at the first end and second connector port located at the second end, each connector port defining an opening leading to said internal cavity; the opening having a vertical major axis and a horizontal minor axis; wherein the first connector port is configured to fit within the second connector port of an adjacent manifold; wherein the first connector port of each of the one or more manifolds is connected to the second connector port of an adjacent manifold, whereby the internal cavity of each manifold is in fluid flow communication with the internal cavity of an adjacent manifold; and one or more conduits configured to receive and disperse wastewater, each conduit having a proximal end and a distal end, wherein the proximal end of each conduit is connected to a conduit port of said manifold.

Clause 2. The system of the embodiment disclosed in clause 1, wherein each of the one or more conduits is perforated.

Clause 3. The system of the embodiment disclosed in clause 2, wherein the openings defined by each of the first and second conduit ports are oblong shaped.

Clause 4. The system of the embodiment disclosed in clause 3, wherein each of the one or more conduits has an oblong shaped cross section.

Clause 5. The system of the embodiment disclosed in clause 4, wherein the walls of each of the one or more conduits include ribbing.

Clause 6. The system of the embodiment disclosed in clause 2, wherein the first conduit port is connected to a proximal end of a first conduit and the second conduit port is connected to a proximal end of a second conduit by snap locks.

Clause 7. The system of the embodiment disclosed in clause 2, wherein the first connector port and the second connector port of the first manifold are configured to snap lock together respectively with the second connector port and the first connector port of a second manifold.

Clause 8. The system of the embodiment disclosed in clause 2, wherein the proximal end of a conduit connects to one of the first connector port or the second connector port of the first manifold.

Clause 9. The system of the embodiment disclosed in clause 2, further comprising at least one endcap connected to the distal end of at least one of the conduits.

Clause 10. The system of the embodiment disclosed in clause 9, wherein the distal end of each conduit comprises an integral fitting.

Clause 11. The system of the embodiment disclosed in clause 6, wherein said of the first conduit is parallel to the second conduit.

Clause 12. The system of the embodiment disclosed in clause 2, further comprising at least one weir located within the opening of the first connector port or the second connector port of the first manifold.

Clause 13. The system of the embodiment disclosed in clause 6, further comprising a third manifold, wherein the distal end of the first conduit connects to a first connector port of the third manifold and the distal end of the second conduit connects to a second connector port of the third manifold.

Further Embodiment D

Clause 1. A system for subsurface treatment of wastewater, comprising a plurality of laterally-spaced apart subsystems each having a lengthwise axis that is parallel to the lengthwise axes of the other subsystems, the first subsystem comprising: first and second manifolds spaced apart from one another along the subsystem lengthwise axis, each of the first and second manifolds having a front wall, a rear wall, an internal cavity for containing wastewater, at least first and second conduit ports having openings in fluid communication with the internal cavity, the first and second conduit ports extending from the rear wall and being configured to connect to an end of a conduit; wherein the first and second conduit ports of the first manifold and the first and second conduit ports of the second manifold face each other; at least first and second conduits, each conduit configured to receive and disperse wastewater, each conduit having a proximal end, a distal end, and an defined by a circumscribing ribbed and perforated wall, the first conduit extending from the first conduit port of the first manifold to the first conduit port of the second manifold and the second conduit extending from the second conduit port of the first manifold to the second conduit port of the second manifold; a second subsystem, spaced apart laterally from the first subsystem; an inflow pipe connected to an opening in an upper portion of the front wall of the first manifold; and a transfer pipe extending from an opening in an upper portion of the front wall of the second manifold of the first subsystem to an opening in an upper portion of the front wall of the first manifold of the second subsystem.

Clause 2. The system of the embodiment disclosed in clause 1, wherein the second subsystem is lower in elevation than the first subsystem.

Clause 3. The system of the embodiment disclosed in clause 1, further comprising a third subsystem, spaced apart laterally from the second subsystem and a transfer pipe extending from an opening in an upper portion of the front wall of the first manifold of the third subsystem to an opening in the upper portion of the front wall of the first manifold of the second subsystem.

Clause 4. The system of the embodiment disclosed in clause 3, wherein the third subsystem is lower in elevation than the second subsystem.

Further Embodiment E

Clause 1. A method of forming an oblong cross section ribbed conduit and an endcap configured for closing either end of the conduit, comprising: blow molding a precursor article having an oblong cross section characterized by a major axis, opposing-side walls parallel to the major axis, internal kiss offs connecting the walls, a plurality of circumscribing lengthwise-spaced apart ribs, a first end that comprises a closure and a second end having an integral precursor fitting; converting the precursor into a conduit and an end cap by: severing the closure from the precursor first end to form a conduit having a plain end; severing the second-end integral precursor fitting into two parts, wherein a first part thereof remains integral with the conduit as a conduit fitting having internal tabs configured for snap lock mating with the plain end of an identical conduit, and wherein a second part comprises an endcap configured for snap lock mating with said conduit fitting or with said plain end.

Further Embodiment F

Clause 1. A molded plastic conduit configured for receiving wastewater within a hollow interior thereof and for dispersing wastewater within soil, the conduit having a proximal end, a distal end with an integrally molded fitting, an oblong cross section wall having a plurality of circumscribing ribs, and a plurality of perforations; and a plurality of conduit ties, the integrally molded fitting having snap lock features shaped to snap lock mate with the proximal end of a like conduit.

Clause 2. The combined part for use in wastewater treatment comprising a conduit of the embodiment disclosed in clause 1-in combination with an end cap having an open end and a closed end; the end cap closed end configured to snap lock with said conduit distal end fitting and the end cap open end configured to snap lock engage with the proximal end of the conduit.

What is claimed is:

1. A manifold of a subsurface wastewater treatment system, comprising:

a front wall having an upper end and a lower end;

a rear wall having an upper end and a lower end;

an internal cavity between the front wall and the rear wall, wherein the front wall and the rear wall are integral with each other at respective upper ends and lower ends;

a length and a central lengthwise axis (CLA), the CLA extending in a horizontal plane along the length of the manifold;

a plurality of conduit ports extending from the rear wall, each of the plurality of conduit ports defining openings connected to said internal cavity;

a first connector port configured at one end of the manifold and defining an opening connected to said internal cavity, the CLA extending through the first connector port;

a second connector port configured at an opposite end of the manifold and defining an opening connected to said internal cavity, the CLA extending through the second connector port; and the plurality of conduit ports comprising a first conduit port and a second conduit port, wherein each of the first conduit port and the second conduit port has a periphery running around an oblong shaped opening that has a vertical major axis and a horizontal minor axis, each of the first conduit port and the second conduit port being configured to receive a conduit having an oblong shape.

2. The manifold of claim 1, wherein both a first conduit configured to be received by the first conduit port and a second conduit configured to be received by the second conduit port extend from the manifold in a direction perpendicular to the CLA.

3. The manifold of claim 1, wherein one or more of the first connector port and the second connector port has the same shape as the shape of to a first conduit port and the second conduit port.

4. The manifold of claim 1, further comprising a wall tie extending within said internal cavity from the front wall of the manifold to the rear wall of the manifold at a location between said first conduit port and said second conduit port.

5. The manifold of claim 1, wherein the front wall includes a plurality of shallow domes, each shallow dome shaped to receive an inlet pipe.

6. The manifold of claim 1, wherein each of the first connector port opening and second connector port opening has an oblong shape having a vertical major axis and a horizontal minor axis; wherein the first connector port is configured to fit within the second connector port of a first different, identical manifold.

7. The manifold of claim 6, wherein the first connector port is configured to connect to the second connector port of a first different, identical manifold and the second connector port is configured to connect to a first connector port of second different, identical manifold.

8. The manifold of claim 7, wherein the connections are snap lock connections.

9. The manifold of claim 7, wherein the first connector port includes a plurality of tabs that project inwardly within the first connector port opening, and wherein each second connector port comprises opposing side external grooves configured to interact with said plurality of tabs when a first connector port is connected to a second connector port of a first different, identical manifold.

10. A subsystem for subsurface treatment of wastewater, comprising:

a first manifold having:

a central lengthwise axis (CLA) extending in a horizontal plane along a length of the manifold, a front wall having an upper end and a lower end, a rear wall having an upper end and a lower end, wherein the front wall and the rear wall are integral with each other at respective upper ends and lower ends and wherein portions of the front wall and rear wall are spaced apart to define an internal cavity configured to hold;

at least a first conduit port and a second conduit port extending from the rear wall, each of the first conduit port and the second conduit port defining an opening connected to said internal cavity; wherein each of the first conduit port and the second conduit port has a periphery running around an oblong shaped opening having a vertical major axis and a horizontal minor axis, each of the first conduit port and the second conduit port being shaped for to receive conduit having an oblong-shaped cross section; and at least a first connector port and an opposing second connector port, each of the first connector port and the second connector port extending along said CLA and defining an opening facing along said CLA that is connected to said internal cavity; wherein each of the first connector port opening and second connector port opening has an oblong shape that has a vertical major axis and a horizontal minor axis; wherein the first connector port is configured to fit within a second connector port of a second manifold being identical to the first manifold; and at least a first conduit and a second conduit, each conduit having a proximal end and a distal end and an oblong-shaped cross section, the first conduit and second conduit being configured to receive and disperse wastewater, wherein the proximal end of the first conduit is connected to said first conduit port of the first manifold and the proximal end of the second conduit is connected to the second conduit port of the first manifold.

11. The subsystem of claim 10, wherein the first conduit and second conduit each have a circumscribing rib and perforations.

12. The subsystem of claim 11, wherein the first conduit port connects to the proximal end of the first conduit by a snap lock and the second conduit port connects to the proximal end of the second conduit port by a snap lock.

13. The subsystem of claim 10, wherein the first connector port and the second connector port of the first manifold are configured to snap lock together respectively with the second connector port and the first connector port of the second manifold being identical to the first manifold.

14. The subsystem of claim 10, wherein a proximal end of third conduit connects with one of the first connector port or the second connector port of the first manifold.

15. The subsystem of claim 10, further comprising an endcap, the endcap connecting to the distal end of at least one of the first conduit and the second conduit.

16. The subsystem of claim 10, wherein the distal end of one or more of the first conduit and the second conduit comprises an internal fitting.

17. The subsystem of claim 11, wherein each of the first conduit and the second conduit is wrapped in geogrid.

18. The subsystem of claim 17, wherein each of the first conduit and the second conduit further comprises a geotextile overlay surrounding the geogrid wrapping.

19. A system for subsurface treatment of wastewater, comprising:

one or more manifolds, each manifold having:

a central lengthwise axis (CLA) extending along a length of the manifold;

a front wall;

a rear wall connected to the front wall;

a first end;

a second end opposite the first end, wherein the front wall, rear wall, first end, and second end define an internal cavity configured to receive and hold wastewater;

at least first and second conduit ports extending from the rear wall, spaced apart along said CLA, each of the at least first and second conduit port defining an opening leading to said internal cavity, the opening having a vertical major axis and a horizontal minor axis; and, a first connector port located at the first end and second connector port located at the second end, each connector port defining an opening leading to said internal cavity; the opening having a vertical major axis and a horizontal minor axis; wherein the first connector port is configured to fit within the second connector port of an adjacent manifold;

wherein the first connector port of each of the one or more manifolds is connected to the second connector port of an adjacent manifold, whereby the internal cavity of each manifold is in fluid flow communication with the internal cavity of an adjacent manifold; and one or more conduits configured to receive and disperse wastewater, each conduit having a proximal end and a distal end, wherein the proximal end of each conduit is connected to a conduit port of said manifold.

* * * * *